(12) United States Patent
Nishiwaki et al.

(10) Patent No.: US 6,748,168 B2
(45) Date of Patent: Jun. 8, 2004

(54) IMAGE CAPTURE APPARATUS HAVING MULTI-FUNCTION ROTARY DEVICE AND PROTECTIVE COVER

(75) Inventors: Kenya Nishiwaki, Kanagawa (JP); Junichi Maniwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/351,508

(22) Filed: Jan. 27, 2003

(65) Prior Publication Data
US 2003/0142971 A1 Jul. 31, 2003

(30) Foreign Application Priority Data

Jan. 29, 2002 (JP) ........................................ 2002/020384
Feb. 15, 2002 (JP) ........................................ 2002/038870

(51) Int. Cl.⁷ .............................................. G03B 15/06
(52) U.S. Cl. ..................... 396/176; 396/177; 396/178; 396/349; 396/448
(58) Field of Search ..................... 396/176–178, 396/349, 448; 348/345

(56) References Cited

U.S. PATENT DOCUMENTS

| | | | | |
|---|---|---|---|---|
| 5,461,441 A | * | 10/1995 | Kotani | 396/349 |
| 5,740,480 A | * | 4/1998 | Kuhn et al. | 396/177 |
| 5,794,084 A | * | 8/1998 | Ikari | 396/178 |
| 6,304,728 B1 | * | 10/2001 | Bittner | 396/177 |
| 6,457,881 B1 | * | 10/2002 | Iida | 396/448 |
| 6,464,411 B1 | * | 10/2002 | Yoshida et al. | 396/349 |
| 6,515,705 B1 | * | 2/2003 | Fumio et al. | 348/375 |

FOREIGN PATENT DOCUMENTS

JP        2000-29096       * 1/2000

* cited by examiner

Primary Examiner—D. Rutledge
(74) Attorney, Agent, or Firm—Fitzpatrick, Cella, Harper & Scinto

(57) ABSTRACT

An image capture apparatus includes: an image capture optical system; a rotary device rotatable from an initial position in a first direction and rotatable from the initial position in a second direction; a protective cover that performs an opening action to expose (uncover) the image capture optical system in response to rotation of the rotary device from the initial position in the first direction, and that performs a closing action to cover the image capture optical system in response to rotation of the rotary device from the initial position in the second direction; and an energizing member that returns the rotary device to the initial position.

32 Claims, 16 Drawing Sheets

IMAGE CAPTURE APPARATUS HAVING MULTI-FUNCTION ROTARY DEVICE AND PROTECTIVE COVER

BACKGROUND OF THE INVENTION

1. Field of the Invention

The present invention relates to an image capture apparatus provided with a lens protective cover (barrier) for covering an image capture lens.

2. Description of the Related Art

Compact cameras having a barrier mechanism for protecting a lens surface during storage and travel have been well-received. Conventionally, such cameras have various commercially practical designs and mechanisms.

FIG. 18 shows an example of such a conventional camera. As shown in FIG. 18, the camera generally includes a camera body having a front cover 21, a barrier cover 22, a picture-taking lens 23, a stroboscope 24 that emits light toward a subject when a picture is taken of the subject under low light conditions, a view finder window 25 for viewing the subject, and a shutter button 26. The barrier cover 22 is attached to the front cover 21 by mating mounting hooks 22a, 22b with groove rails 21a, 21b, respectively, whereby the barrier cover 22 may slide back and forth across the front cover 21.

In a picture taking operation, the photographer first manually slides the barrier cover 22 from right to left, as shown in FIG. 18, to an open position, thereby exposing the picture-taking lens 23 and the view finder window 25. After optionally performing various focus and exposure operations, a picture is taken by depressing the shutter button 26. After the picture taking operation is completed, the photographer slides the barrier cover 22 back from left to right, as shown in FIG. 18, thereby covering the image capture lens and the view finder window 25. The camera is thus ready for storage, with the picture-taking lens 23 and the view finder window 25 covered for protection from inadvertent impact, contact and environmental elements.

This conventional arrangement has several drawbacks. The lens must be arranged close to a side end surface of the camera body (for example, the right side end surface as shown in FIG. 18) in order to maintain a desired compact camera body; that is, it is not possible to locate a large lens at or near the center of the camera body and still provide sufficient room for sliding the barrier cover to an open position. Since the movement range of the barrier cover takes up a large space, protrusions and other structural elements, such as a grip, and other emblems or marks, cannot be conveniently arranged on the front cover of the camera. The location of the view finder window and stroboscope also are subject to significant restrictions. The large sliding motion of the barrier cover may be onerous, and typically has a feeling of poor agility. Finally, the sliding motion of the barrier cover cannot be used to perform repetitive switching functions, whereby the barrier cover is likely to serve only the function of opening and closing so as to expose and cover the picture-taking lens, and optionally the view finder window and/or stroboscope.

The barrier cover 22 also is aesthetically unappealing. The barrier cover generally has a reduced thickness, to reduce its size and weight and facilitate the sliding operation. When the photographer slides the barrier cover over the large sliding range, as discussed above, the thin side surface and the inside of the cover become fully exposed to view. This construction makes the camera appear cheap, and gives the camera a feeling of poor precision. This also exposes a large area of the camera body inside the barrier cover to undesirable external elements, such as sand, dust and other foreign matter. In such construction, the picture-taking lens also is exposed to greater risk of fingerprints due to contact with the photographer's fingers associated with increased handling. Finally, the large size of the barrier cover makes it prone to inadvertent opening, for example, during storage and travel; such inadvertent opening is undesirable and may result in damage to the barrier cover, the picture-taking lens, the view finder window or the stroboscope.

SUMMARY OF THE INVENTION

It is an object of the present invention to provide an image capture apparatus which has excellent design flexibility and decency and which is provided with a lens protective cover capable of effectively improving functionality, usability, etc.

In order to achieve the aforementioned object, one aspect of the present invention is an image capture apparatus including a protective cover for opening and closing the front of an image capture optical system, a rotary device which brings the aforementioned protective cover into an opening action by rotating from the initial position in a first direction and which brings the aforementioned protective cover into a closing action by rotating from the aforementioned initial position in a second direction, and an energizing member for returning the aforementioned rotary device to the aforementioned initial position.

Another aspect of the present invention is an image capture apparatus including a protective cover for opening and closing the front of an image capture optical system, a rotary device which brings the aforementioned protective cover into an opening action by rotating from the initial position in a first direction and which brings the aforementioned protective cover into a closing action by rotating from the aforementioned initial position in a second direction, and a control device which brings the aforementioned image capture apparatus into an activated condition in response to rotation of the aforementioned rotary device in the aforementioned first direction and which sequentially switches the action mode to different action modes in response to each rotation of the aforementioned rotary device in the aforementioned first direction while the aforementioned image capture apparatus is in an activated condition.

Further objects, aspects, features and advantages of the present invention will become apparent from the following description of the preferred embodiments with reference to the attached drawings.

DESCRIPTION OF THE PREFERRED EMBODIMENTS

The preferred embodiments of the present invention will be described below in detail with reference to the drawings.

Figure 1A:
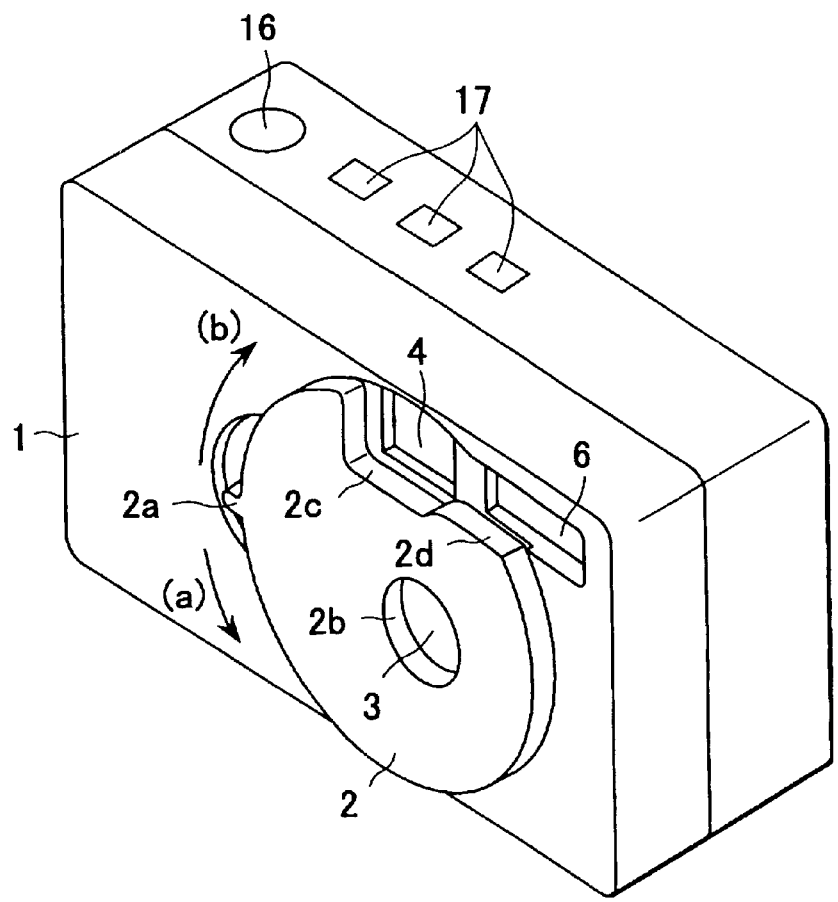
FIG. 1A is an external front view and FIG. 1B is an external rear view of a camera according to an embodiment of the present invention.
Figure 1B:
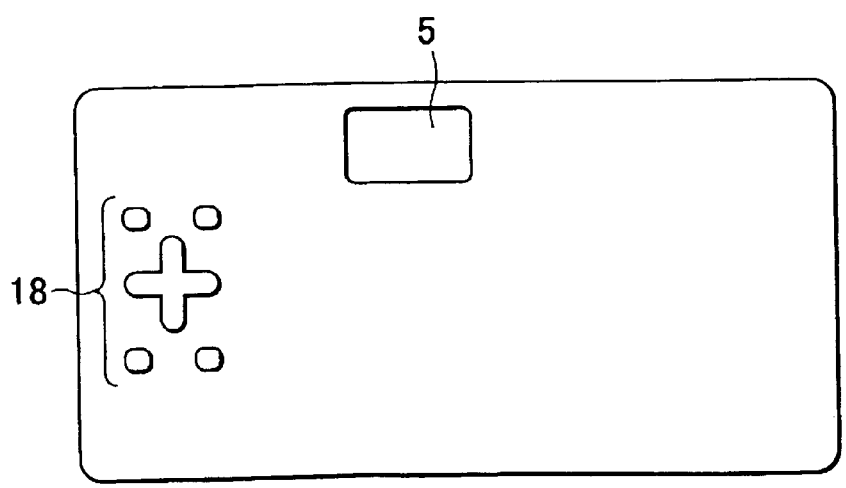

FIG. 1A is an external front view and FIG. 1B is an external rear view of a camera according to an embodiment of the present invention. In the drawings, reference numeral 1 denotes a front cover of a camera body. Reference numeral 2 denotes a barrier cover which is generally circular, attached to the front cover 1, and freely rotatable by a predetermined amount. An operation lever 2a protrudes from one point on the circumference thereof; as discussed below, a photographer can rotate the rotary barrier cover 2 in a forward direction (arrow a) and a reverse direction (arrow b) by manually operating this operation lever 2a. Since the rotary barrier cover 2 is generally circular, and rotatable about a central portion thereof, it will be appreciated that the area occupied by the rotary barrier cover 2 in a surface region of the front cover 1 can be significantly reduced.

An aperture 2b is provided in the rotary barrier cover 2, and a barrier member 3 is arranged as an intermediate layer between the front cover 1 and the rotary barrier cover 2 while covering the aperture 2b. The barrier member 3 may be withdrawn by rotation so as not to cover the aperture 2b in response to rotation of the rotary barrier cover 2, as described below.

Reference numeral 4 denotes a view finder window located on the front of the camera body (see FIG. 1A), and reference numeral 5 denotes an eyepiece located on the back of the camera body (see FIG. 1B), which are arranged to permit a photographer to view a subject when a picture is to be taken. In order to avoid obstruction of the optical path thereof, a notch (cut-out) 2c is arranged at a portion of the rotary barrier cover 2 overlapping the view finder window 4. Reference numeral 6 denotes a stroboscope emission portion which emits fill light toward a subject when a picture of the subject is to be taken under low light conditions. In order to avoid obstruction of the optical path thereof, a notch (cut-out) 2d is arranged at a portion of the rotary barrier cover 2 overlapping the stroboscope emission portion 6. In this manner, the view finder window 4 and the stroboscope emission portion 6 can be compactly arranged within a limited surface region of the front cover 1.

Figure 2:
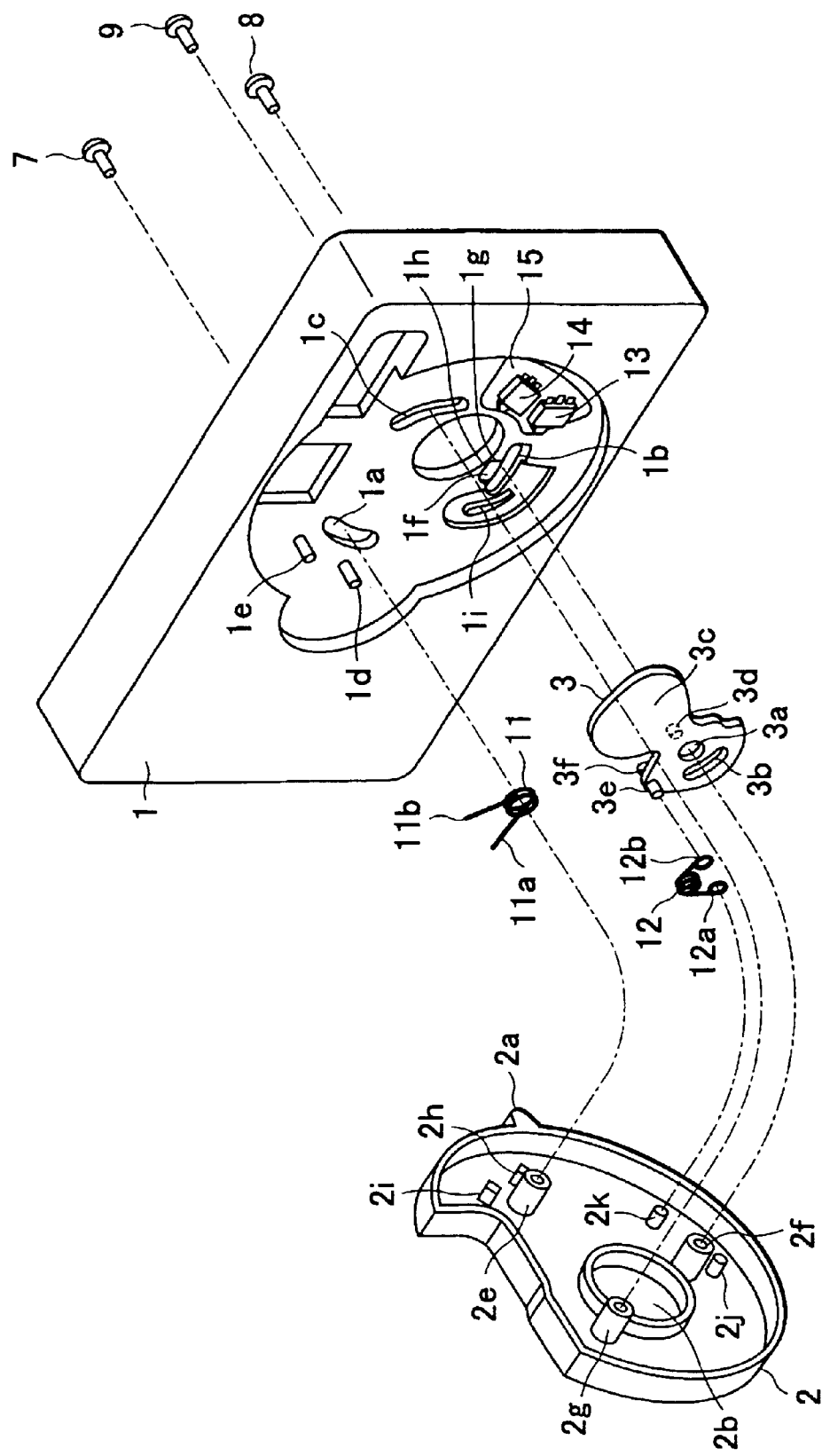
FIG. 2 is an exploded view showing details of a rotary barrier cover in an embodiment of the present invention.

Next, the configuration of the rotary barrier cover 2 will be described in detail with reference to FIG. 2, which is an exploded view thereof.

Three mounting posts 2e, 2f and 2g are arranged on a rear side of the rotary barrier cover 2. These mounting posts 2e, 2f, 2g are arranged at nearly equivalent spacings on the circumference of a circle having a radius on the order of 15 mm from a rotational center of the rotary barrier cover 2; each has a hollow cylindrical structure for receiving a respective one of fastening screws 7, 8 and 9 in a tip thereof. The front cover 1 is provided with corresponding mounting holes 1a, 1b and 1c. These mounting holes 1a, 1b and 1c are arranged on the circumference of a circle having a radius the same as the mounting posts 2e, 2f, 2g in order to face and receive the mounting posts 2e, 2f and 2g, respectively; the mounting holes 1a, 1b and 1c each has an elliptical shape extended in the circumferential direction by predetermined amounts. When assembled, the mounting posts 2e, 2f and 2g penetrate the corresponding mounting holes 1a, 1b and 1c, and are fastened with the three screws 7, 8 and 9 from the interior of the camera body. In this manner, the rotary barrier cover 2 is mounted to the front cover 1 such that the barrier cover is rotatable by a predetermined amount.

Since the above-described mounting and movement mechanism of the rotary barrier cover 2 and the front cover 1 is arranged at a location some distance from the rotational center, a large space becomes available in the central region of the rotary barrier cover 2. In this manner, an image capture lens 10 can be arranged at the center of the camera body and, therefore, an image capture apparatus having excellent operability and flexibility in design can be realized.

A first energizing spring 11 is arranged and supported on the rotary barrier cover 2 by mounting post 2e, which penetrates a circular center portion thereof, whereby the spring tips 11a and 11b are brought into contact with hook portions 2h and 2i, respectively, arranged on the rotary barrier cover 2. Spring receivers 1d and 1e are arranged on the front cover 1, and are brought into contact with the spring tips 11a and 11b, respectively. Consequently, in the initial position, in which no external force is applied, the rotary barrier cover 2 is stationary and stable, and the spring tips 11a and 11b of the first energizing spring 11 initially are in contact with the hook portions 2h and 2i and the spring receivers 1d and 1e.

A barrier member 3 is arranged and supported on the rotary barrier cover 2 such that mounting post 2f of the rotary barrier cover 2 penetrates through mounting hole 3a of the barrier member 3, and a stopper 2j arranged on the rotary barrier cover 2 penetrates through an elliptical hole 3*b* extending in a circumference direction centered on the mounting hole 3*a*. That is, the barrier member 3 is rotatable about the mounting hole 3*a* within a movement range of the elliptical hole 3*b* until the stopper 2*j* comes into contact with an end surface of the elliptical hole 3*b*. Reference numeral 3*c* denotes a barrier surface arranged at a radial extension of the barrier member 3, which selectively covers and uncovers the aperture 2*b* of the rotary barrier cover 2 (switches between the closed and open conditions) by rotation of the barrier member 3 within the aforementioned movement range.

As described above, the barrier member 3 is not arranged on the front cover 1, but rather is arranged and supported directly on the rotary barrier cover 2, and the movement range thereof is regulated directly by the rotary barrier cover 2. In this manner, an area of the barrier surface 3*c* can be maximized so as to make the most effective use of the available space, whereby collision with the first energizing spring 11 and the mounting posts 2*e* and 2*g* does not occur compared with an arrangement in which the barrier member 3 is arranged and supported on the front cover 1. In this manner, since the aperture area of the aperture 2*b* can also be increased, it will be appreciated that the image capture lens 10 can be a fast lens having a large aperture.

Reference numeral 3*d* denotes a barrier driving post which is arranged on the back side of the barrier member 3, for driving the barrier member 3 in response to a rotational torque of the rotary barrier cover 2. In order to ensure a movement space for the barrier driving post 3*d*, a barrier-driving-post groove *if* is provided in the front cover 1. When the rotary barrier cover 2 is rotated, side walls 1*g* and 1*h* of the barrier-driving-post groove *if* alternatively/selectively are brought into contact with the barrier driving post 3*d*, such that the rotational torque is applied to the barrier member 3.

Reference numeral 12 denotes a second energizing spring, including spring tips 12*a* and 12*b*, each of which is wound in the shape of a circle. Energizing spring 12 is energized by a predetermined amount by a spring post 2*k* arranged on the rotary barrier cover 2 that penetrates through the circle of one spring tip 12*a*, and a spring post 3*e* arranged on the barrier member 3 that penetrates through the circle of the other spring tip 12*b*. The positional relationship between the spring post 2*k* and the spring post 3*e* is predetermined so that when the barrier member 3 is at a midpoint position within the movement range, the spring posts 2*k* and 3*e* are brought closest to each other, and a straight line extending through the two posts 2*k* and 3*e* passes through the center of the mounting hole 3*a* of the barrier member 3.

In this manner, the barrier member 3 is energized in a direction of the end of the movement range by the second energizing spring 12, in the neighborhood of both ends of the movement range, and assumes a stationary condition in the neighborhood of a midpoint position, because the energizing forces of the two spring tips 12*a*, 12*b* at this point are opposite, and cancel one another. In order to prevent a condition where the barrier member 3 becomes stationary at the midpoint position while the aperture 2*b* stays in a half-open condition via the barrier surface 3*c*, a midpoint position avoidance post 3*f* is arranged on the back of barrier member 3 opposite the spring post 3*e*. This structure functions so as to return the barrier member 3 in the direction of the corresponding end position in the movement range by being pushed with a midpoint position avoidance cam 1*i* arranged on the front cover 1 such that the rotary barrier cover 2 cannot be returned to the initial position while the barrier member 3 remains at the midpoint position.

Reference numerals 13 and 14 denote a first switch and a second switch, respectively. Each of these switches is mounted on a flexible substrate 15 (hereafter referred to as "mounting substrate"), which is fixed to the front cover 1. Detection signals are sent from these switches to an internal processing circuit (not shown), through a signal line extended from the mounting substrate 15. The first switch 13 is switched ON when pushed by press contact with the barrier member 3 as the rotary barrier cover 2 is rotated in the forward direction by a predetermined angle. The second switch 14 is switched ON when pushed by press contact with the tip of the barrier surface 3*c*, which acts as a cam surface as the barrier member 3 is rotated so as to close (cover) the aperture 2*b*.

Figure 18:
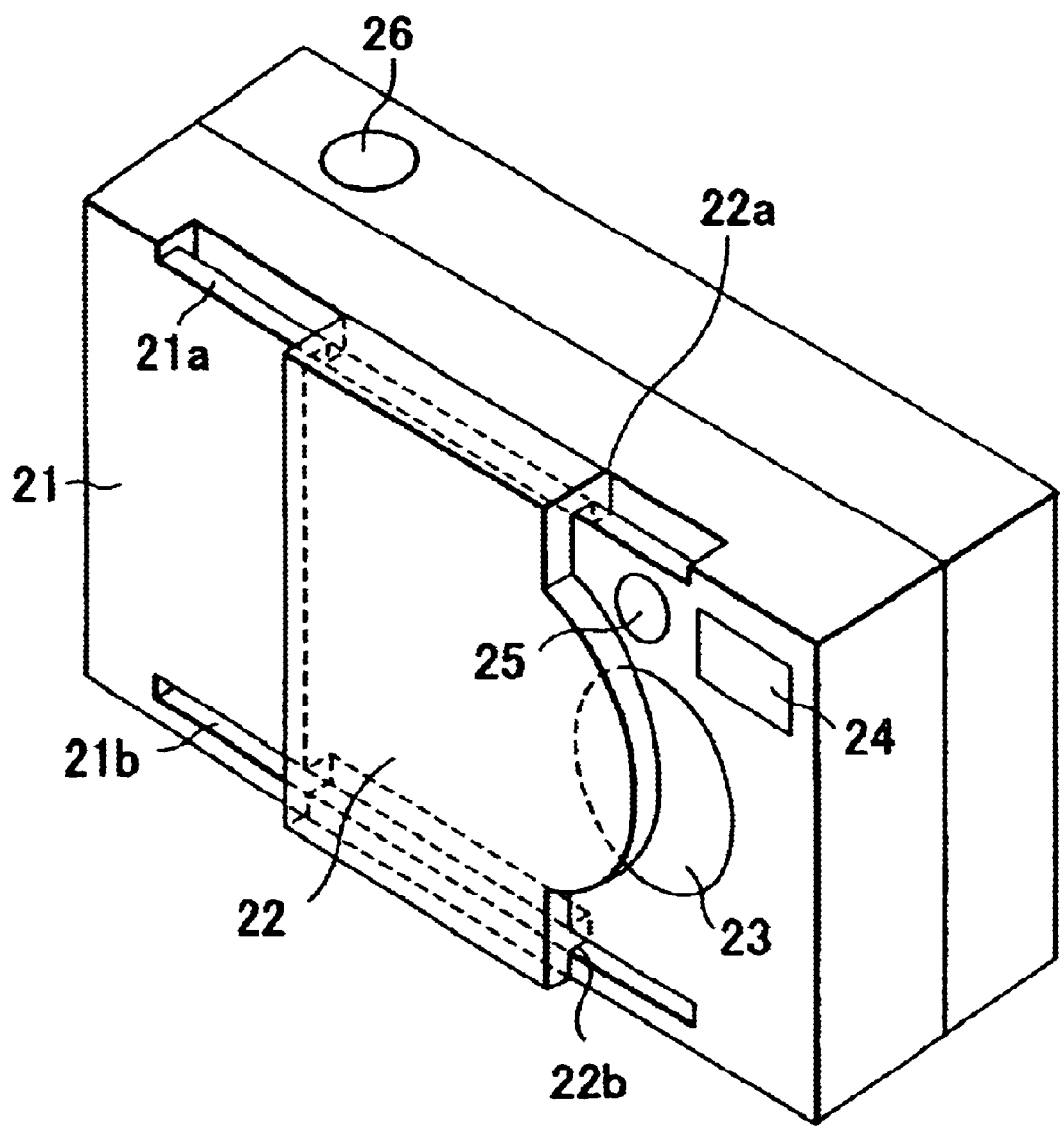
FIG. 18 is an external view of a camera according to a conventional example.

Reference numeral 16 denotes a shutter button for starting a picture taking operation, reference numeral 17 denotes various image display portions for displaying images, and reference numeral 18 denotes various operation buttons arranged on the back of the camera body in order to input various action (operation) mode instructions and information (see FIG. 18). Each of these elements may be based on common conventional technologies and configurations and, therefore, detailed descriptions thereof are omitted.

The image capture apparatus according to the present invention is configured as described above. Operations of the image capture apparatus will be described below with reference to FIG. 3 to FIG. 8.

Figure 3:
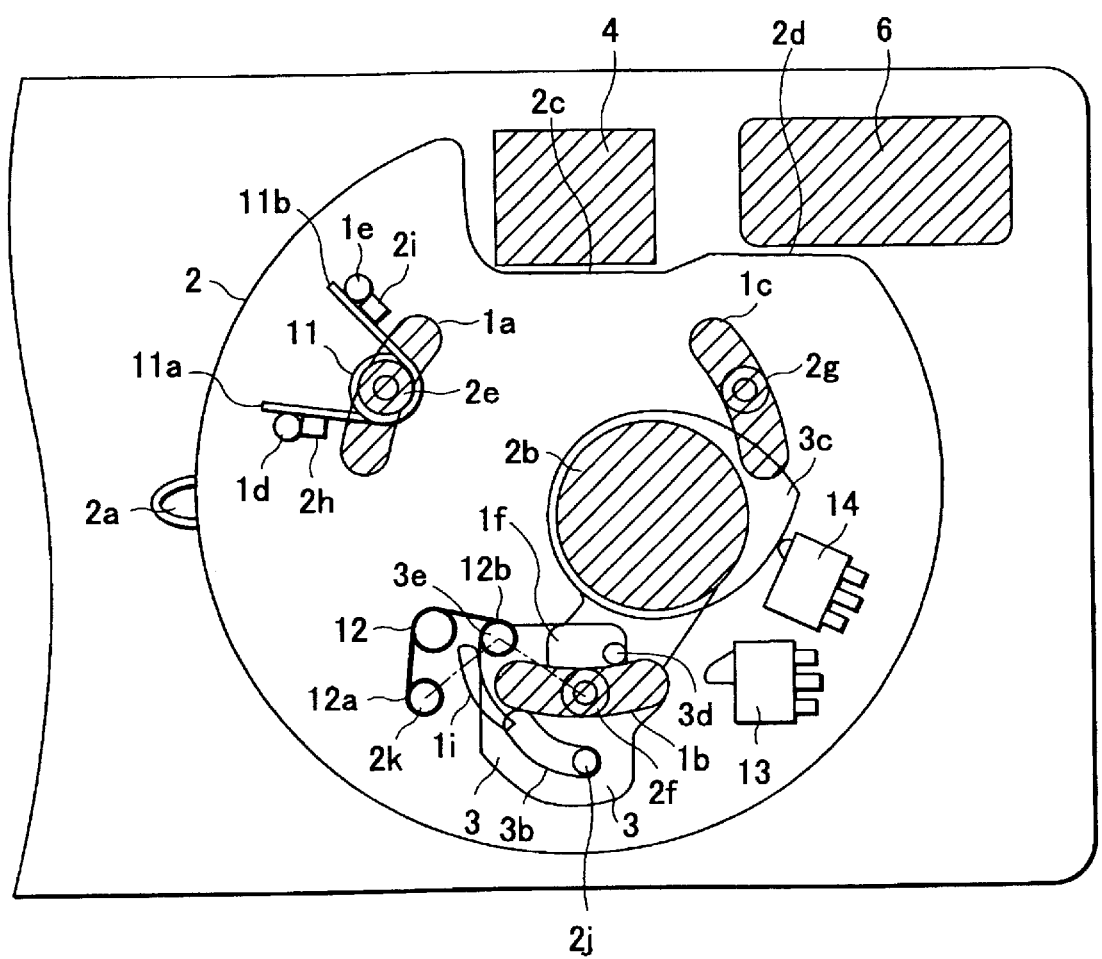
FIG. 3 is a diagram showing a condition in which the rotary barrier cover is in an initial position and the aperture is in a completely closed condition.

Similar to various common electronic apparatuses, in the present image capture apparatus, a main power switch is maintained in the OFF position during standby conditions, and various internal electronic circuits maintain a clock function, and the like, with very low power consumption. At this time, as shown in FIG. 3, the rotary barrier cover 2 is maintained at an initial position by a stabilizing biasing force of the first energizing spring 11, and the barrier surface 3*c* of the barrier member 3 is maintained at an initial position that covers the aperture 2*b* by a stabilizing biasing force of the second energizing spring 12. At this time, the barrier surface 3*c* also is stabilized/biased to push the second switch 14 by press contact so as to maintain the second switch 14 in the ON position. In this position, the barrier member 3 does not contact the first switch 13 and, therefore, the first switch 13 remains in the OFF position.

Consequently, by providing a control circuit with an algorithm which establishes a standby state awaiting the main switch to be turned ON, that is under the condition wherein the first switch 13 is in the OFF position and the second switch 14 is in the ON position, as described above, the present image capture apparatus can be maintained in a standby state when the barrier member 3 covers the aperture 2*b*.

A start-up operation of the image capture apparatus from this standby state will be described below.

When the image capture apparatus is in an initial condition as shown in FIG. 3, as the photographer moves the operation lever 2*a* so as to rotate the rotary barrier cover 2 in the forward direction (arrow a), the barrier member 3 mounted on the mounting post 2*f* begins to rotate in the forward direction integrally with the rotary barrier cover 2 while maintaining the relative relation therebetween by energization of the second energizing spring 12. However, when the barrier driving post 3*d* is brought into contact with the side wall 1*g* of the barrier-driving-post groove 1*f* and is subjected to a reaction force thereof, the barrier member 3 cannot further be rotated integrally with the rotary barrier cover 2 without interference. Accompanying further rotation of the rotary barrier cover 2 in the forward direction, the barrier member 3 follows the rotation of the rotary barrier cover 2, while the barrier member 3 itself opposes the energization of the second energizing spring 12 and thereby rotates about the mounting hole 3a in a direction so as to fully expose (uncover) the aperture 2b, whereby the condition shown in FIG. 4 is obtained.

Figure 4:
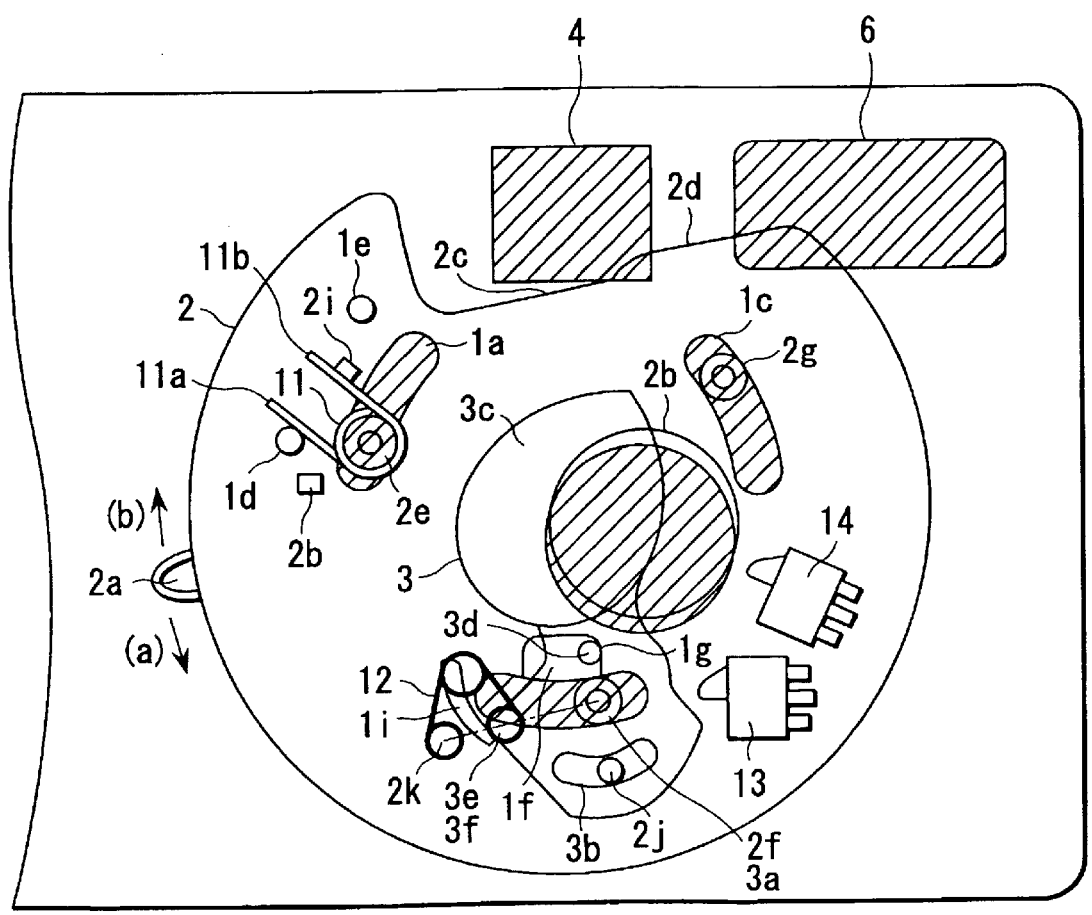
FIG. 4 is a diagram showing a condition in which the rotary barrier cover is at the midpoint of rotation in a forward direction, and the aperture is in a half-open condition.

In FIG. 4, the extension of a straight line connecting the spring post 2k of the rotary barrier cover 2 and the spring post 3e of the barrier member 3 passes through the center of the mounting hole 3a of the barrier member 3 (see dot-dash line). In this manner, the second energizing spring 12 cannot apply a rotational vector force to the barrier member 3; rather, it only applies axial pressure so as to bring the barrier member 3 into a stationary condition. At this time, the aperture 2b is in a half-open condition, with half of the barrier surface 3a withdrawn from aperture 2b. The second switch 14 is not in press contact with the barrier surface 3c and, therefore, is switched to the OFF position.

Figure 5:
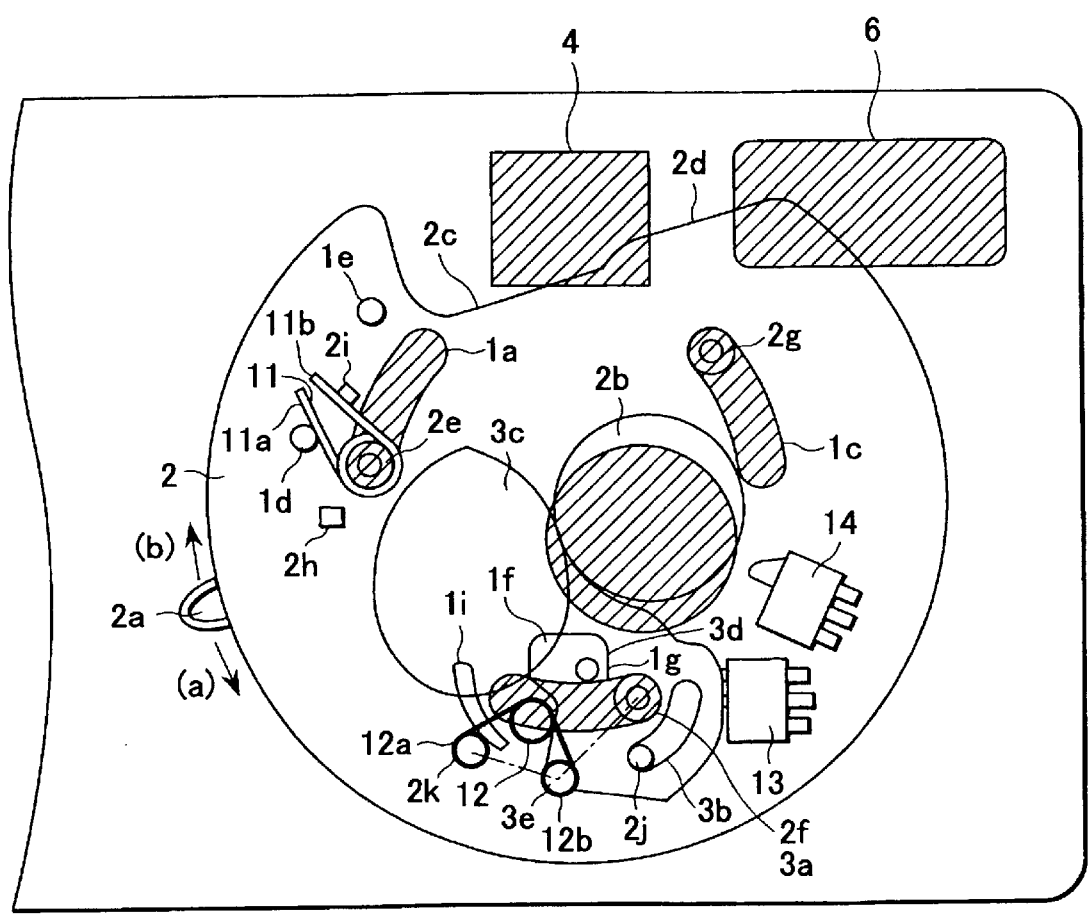
FIG. 5 is a diagram showing a condition in which rotation of the rotary barrier cover in the forward direction is completed, and the aperture is in a completely open condition.

As the rotary barrier cover 2 continues to rotate due to continued manual operation by the photographer, the extension of the straight line connecting the spring post 2k of the rotary barrier cover 2 and the spring post 3e of the barrier member 3 deviates from the center of the mounting hole 3a of the barrier member 3. In this manner, the energizing force of the second energizing spring 12, which functions to increase the distance between the two posts 2k, 3e applies a rotational vector force to the barrier member 3 in a direction so as to achieve a full open state (uncovered) of the aperture 2b. Consequently, even though the barrier driving post 3d is not subjected to any further reaction force from the side wall 1g of the barrier-driving-post groove 1f, the barrier member 3 is rotated so as to reliably bring the aperture 2b into a full open condition by energization of the second energizing spring 12, as shown in FIG. 5. In this manner, the barrier member 3 press contacts the first switch 13, which is switched to the ON position.

Figure 6:
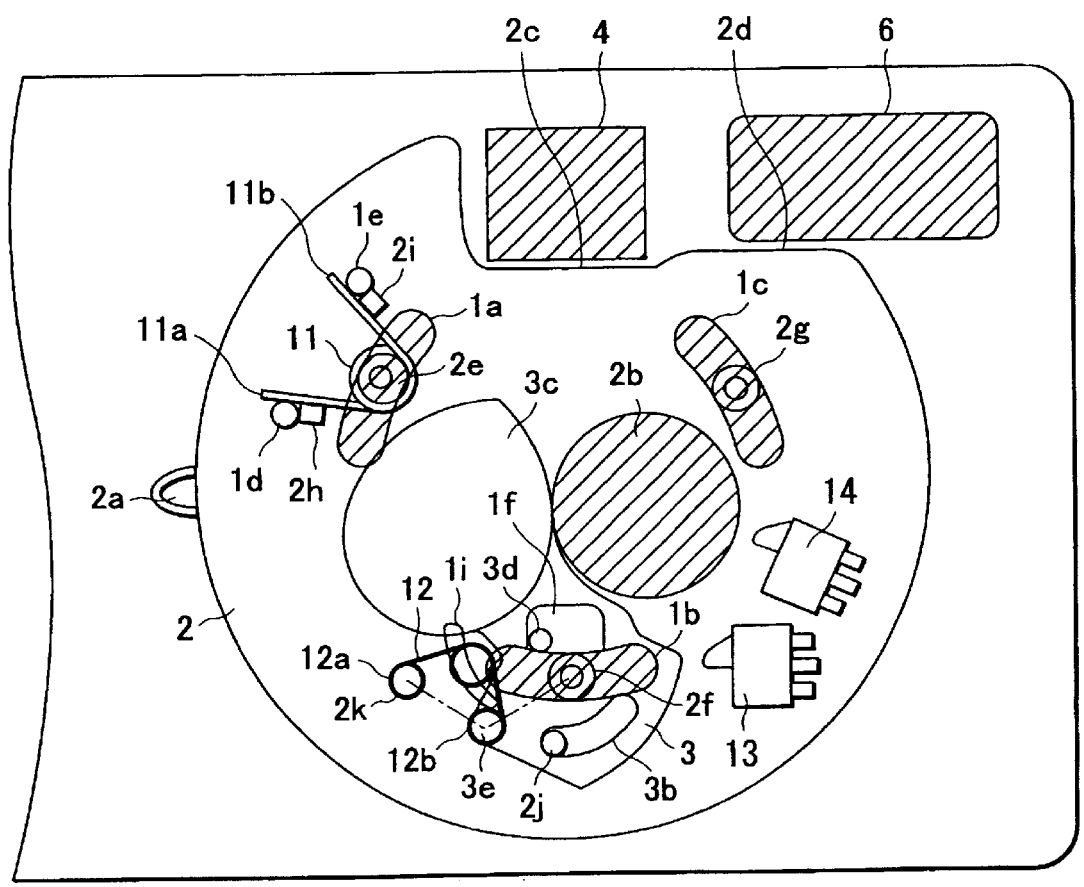
FIG. 6 is a diagram showing a condition in which the rotary barrier cover in the initial position, and the aperture is in a completely open condition.

When the aperture 2b is brought into a full open state, the photographer releases the operation lever 2a. At this time, the first energizing spring 11 mounted on the mounting post 2e of the rotary barrier cover 2 functions such that the spring tip 11a pushes the spring receiver 1d of the front cover 1 so as to bias the rotary barrier cover 2 to rotate in the reverse direction (arrow b). Consequently, the rotary barrier cover 2 is rotated in the reverse direction upon release of the operation lever 2a by the photographer, and is returned to the condition that the spring tip 11a is in contact with hook portion 2h arranged on the rotary barrier cover 2, as shown in FIG. 6; that is, it is returned to the initial position, so as to become stationary and stable. In this configuration, the barrier member 3 does not press contact the first switch 13, which therefore is switched to the OFF position. As described above, since the rotary barrier cover 2 is returned to the initial position when the photographer's hand is removed after manual operation, the rotary barrier cover 2 can regain and maintain an attitude with no inclination. In this manner, since the notches (cut-outs) 2c and 2d are arranged in correspondence with the view finder window 4 and the stroboscope emission portion 6, it is possible to maintain an attractive, aesthetic design and to provide easy operation of the operation lever 2a.

As described above, the photographer reliably can bring the aperture 2b into a full open state by a series of simple lever operations, and no phenomena of failures, for example, half-open aperture states, occur. Although the rotary barrier cover 2 must be rotated against the energization force of the first energizing spring 11, since the photographer manually operates the operation lever 2a protruded from the circumference of the rotary barrier cover 2, this movement can be performed with a small force and the operation can be performed with ease.

The first switch 13 thus is switched to the ON position on a temporary basis by manually operating the operation lever 2a in the forward direction (arrow a) and, thereafter, is returned to the OFF position by releasing the operation lever 2a. The second switch 14 is switched to the OFF position by withdrawing the barrier surface 3c and is left in that condition. Consequently, by constructing an algorithm for deciding that a main switch (main power switch) should be turned ON based on the condition of the switches through a series of actions performed up to this point, that is, based on the condition that initially the second switch 14 is in the OFF position, and then, under that condition, the first switch 13 is switched to the ON position on a temporary basis, the main switch of the apparatus can be turned ON at the same time the aperture 2b is switched to the full open state and, therefore, a start-up (activation) operation can be completed simply by operating the operation lever 2a.

If the operation lever 2a is released in the midstream condition shown in FIG. 4, rotation of the rotary barrier cover 2 is reversed by the energization force of the first energizing spring 11, and begins to return to the initial position while leaving the aperture 2b in the half-open condition. However, in this case, the midpoint position avoidance post 3f of the barrier member 3 is pushed by press contact with the midpoint position avoidance hook 1i and, therefore, the barrier member 3 is reverse rotated so as to close (cover) the aperture 2b. In this manner, the extension of a straight line connecting the spring post 2k and the spring post 3e deviates from the center of the mounting hole 3a of the barrier member 3, and the energizing force of the second energizing spring 12 applies a rotational vector force to the barrier member 3 in a direction such that the barrier member 3 covers the aperture 2b. Consequently, when the rotary barrier cover 2 is returned to the initial position, the aperture 2b is not left in a half-open condition but reliably is returned to a fully closed condition.

Next, various operations, for example, picture taking, using this image capture apparatus will be described.

During a picture taking operation, a subject image incident through the aperture 2b is captured with the image capture lens 10, and an image processed by the internal circuit (not shown) is observed using the image display portion 17. Alternatively, a subject image incident through the view finder window 4 may be observed through the eyepiece 5, a picture-taking angle may be determined and, when the shutter button is pushed, an image processed by the internal circuit may be stored in memory, etc., inside the apparatus. The form and function of each of these elements thus is similar to those in common conventional technologies and configurations.

Selection of action (operating) modes now will be described.

After a picture taking operation is completed, the photographer moves the operation lever 2a from the condition shown in FIG. 6 so as to rotate the rotary barrier cover 2 in the forward direction (arrow a), in a manner similar to that described above. The barrier member 3 mounted on the mounting post 2f is rotated in the forward direction integrally with the rotary barrier cover 2 while maintaining the relative relation therebetween. At this time, in contrast to that in the above description, the barrier member 3 has already (previously) brought the aperture 2b into a full open state, and is in a stable condition due to the energization force of the second energizing spring 12. Furthermore, the barrier driving post 3d is located at a position separated from the side wall 1g of the barrier-driving-post groove 1f. Consequently, the barrier member 3 continues to rotate together with the rotary barrier cover 2 without interference until it reaches a condition similar to that shown in FIG. 5. Therefore, the first switch 13 is switched to the ON position by press contact with the barrier member 3.

Subsequently, the photographer releases the operation lever 2a. Then, in a manner similar to that described above, the rotary barrier cover 2 is rotated in the reverse direction (arrow b) by the energization force of the first energizing spring 11, and is returned to the initial position before operation, as shown in FIG. 6, so as to become stationary and stable. At this time, the first switch 13 is not pushed by press contact and, therefore, is switched to the OFF position.

According to the aforementioned operation, the first switch 13 can be switched to the ON position on a temporary basis and, thereafter, be returned to the OFF position while maintaining the aperture 2b in a full open condition. Consequently, by using the output signal of the first switch 13, it is possible to apply this switching action to operations other than detection of the opening and closing of the barrier member 3. For example, the image capture apparatus, similar to common electronic equipment, in many cases may operate in a so-called power-saving mode, in which after a predetermined time has elapsed in a non-operation condition, only a clock function and the like are maintained, and the operational state is returned to a condition in which an operation to turn ON the main switch is awaited. It is also possible to use this switching operation to return the apparatus to the picture-taking mode. That is, when the image capture apparatus is left standing under the condition shown in FIG. 6 in the picture-taking mode, after a predetermined time has elapsed, the image capture apparatus is automatically switched to the power-saving mode. That is, an automatic shut-off function for automatically shutting off the built-in electronic circuit is included. In order to return from this shut-off condition to the picture-taking mode, an algorithm may be constructed for returning the image capture apparatus to the picture-taking mode by simply turning the first switch 13 to the ON position, as shown in FIG. 5.

In general, the image capture apparatus has an operation mode for playing back an image previously taken in a picture-taking mode, in addition to the picture-taking mode. In this case as well, an algorithm may be constructed in which, when the first switch 13 is turned ON in the picture-taking mode, the operation mode is switched to the playback mode and, thereafter, when the first switch 13 again is turned ON, is switched back to the picture-taking mode; this mode switching operation may be repeated. In this manner, the photographer conveniently can play back and check an image on the image display portion 17 immediately after a picture-taking operation simply by operating the operation lever 2a, and then can continue further picture-taking operations.

Operations for shutting down the system now will be described. Under the condition shown in FIG. 6, the photographer manually moves the operation lever 2a so as to rotate the rotary barrier cover 2 in the reverse direction (arrow b). The barrier member 3 mounted on the mounting post 2f begins to rotate in the reverse direction integrally with the rotary barrier cover 2 while maintaining the relative relation therebetween by energization of the second energizing spring 12. However, since the barrier driving post 3d is brought into contact with the side wall 1h of the barrier-driving-post groove 1f and is subjected to a reaction force thereof, the barrier member 3 cannot further be rotated integrally with the rotary barrier cover 2 without interference. Accompanying further rotation of the rotary barrier cover 2 in the reverse direction, the barrier member 3 follows the rotation of the rotary barrier cover 2, while the barrier member 3 itself opposes the energization of the second energizing spring 12 and rotates about the mounting hole 3a in a direction such that the barrier member 3 closes (covers) the aperture 2b and, therefore, the condition shown in FIG. 7 is obtained.

Figure 7:
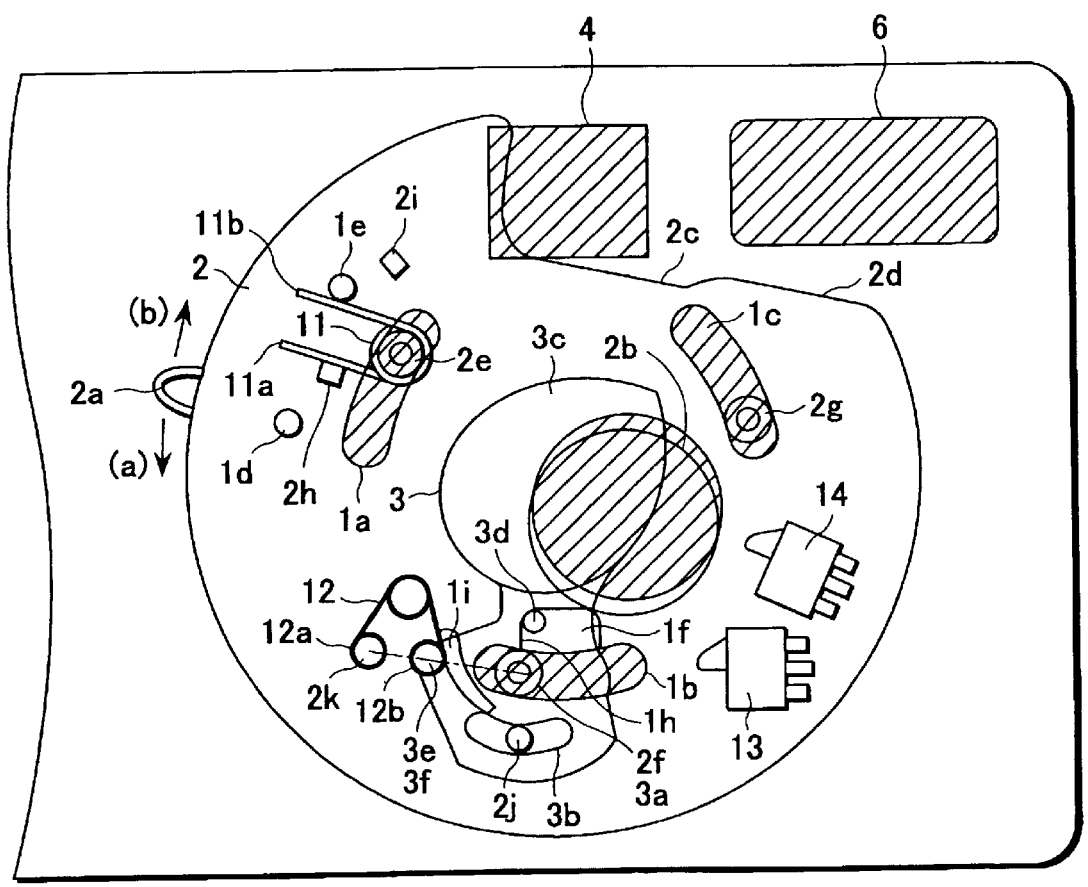
FIG. 7 is a diagram showing a condition in which the rotary barrier cover is at a midpoint of rotation in a reverse direction, and the aperture is in a half-closed condition.

In FIG. 7, the extension of a straight line connecting the spring post 2k of the rotary barrier cover 2 and the spring post 3e of the barrier member 3 passes through the center of the mounting hole 3a of the barrier member 3. In this manner, the second energizing spring 12 cannot apply a rotational vector force to the barrier member 3, and only applies axial pressure so as to bring the barrier member 3 into a stationary condition. At this time, the aperture 2b is in a half-closed condition, with half of the barrier surface 3a withdrawn from the aperture 2b. The second switch 14 is not pushed by press contact with the barrier surface 3c and, therefore, is switched in the OFF state.

Figure 8:
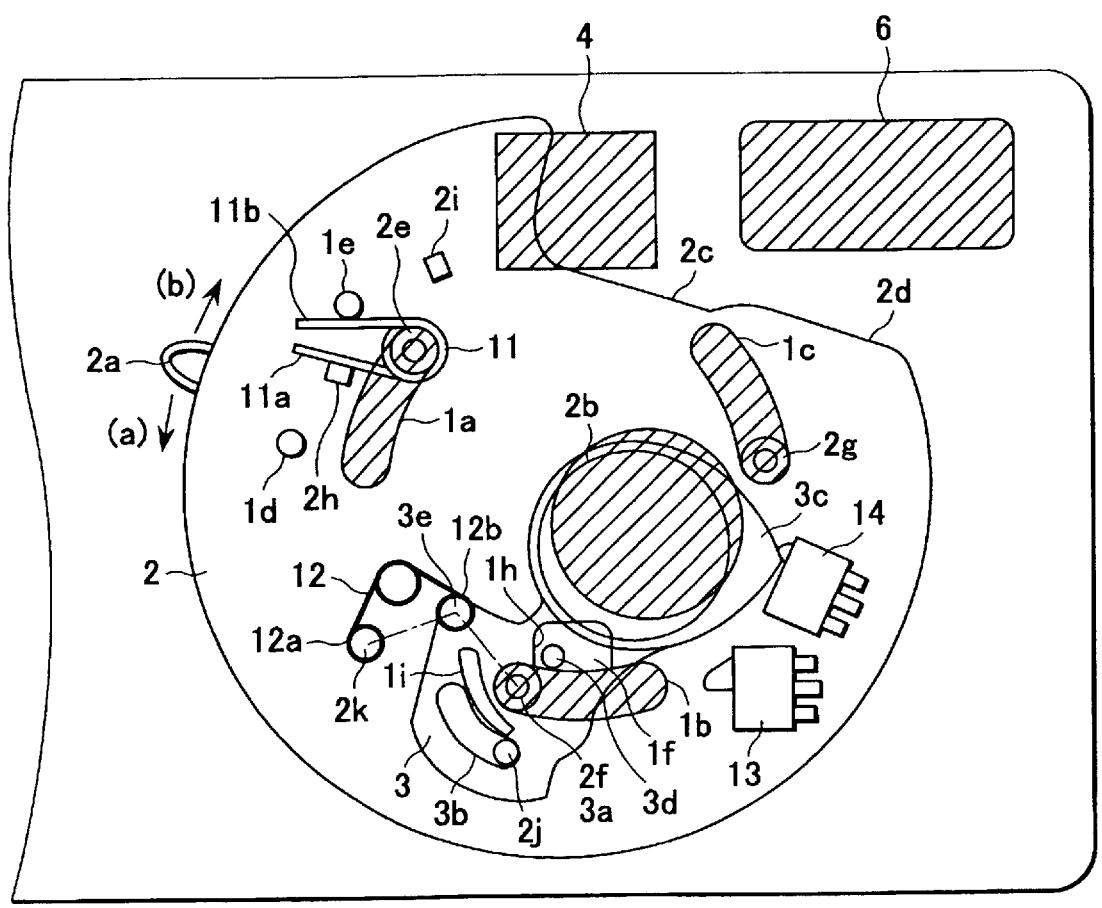
FIG. 8 is a diagram showing a condition in which rotation of the rotary barrier cover in the reverse direction is completed, and the aperture is in a completely closed condition.

As the rotary barrier cover 2 continues to rotate by continued manual operation by the photographer, the extension of the straight line connecting the spring post 2k of the rotary barrier cover 2 and the spring post 3e of the barrier member 3 deviates from the center of the mounting hole 3a of the barrier member 3. Then, the energizing force of the second energizing spring 12, which functions so as to increase the distance between the two posts, applies a rotational vector force to the barrier member 3 in a direction so as to close (cover) the aperture 2b. Consequently, even when the barrier driving post 3d is not subjected to any further reaction force from the side wall 1h of the barrier-driving-post groove 1f, the barrier member 3 reliably and completely closes (covers) the aperture 2b due to the energization force of the second energizing spring 12, as shown in FIG. 8. At this time, the second switch 14 is switched to the ON position by press contact with the tip of the barrier surface 3c.

When the aperture 2b is completely closed (covered), the photographer releases the operation lever 2a. At this time, regarding the first energizing spring 11 mounted on the mounting post 2e of the rotary barrier cover 2, the spring tip 11b pushes the spring receiver 1e of the front cover 1 so as to energize the rotary barrier cover 2 to move in the forward direction (arrow a). Consequently, the rotary barrier cover 2 is rotated in the forward direction by releasing the operation lever 2a, and is returned to the condition that the spring tip 11b is in contact with hook portion 2i arranged on the rotary barrier cover 2, as shown in FIG. 3; that is, the first energizing spring 11 returns the rotary barrier cover 2 to the initial position, so as to become stationary and stable. The second switch 14 is maintained in the ON state. As described above, since the rotary barrier cover 2 is returned to the initial position when the photographer's hand is removed after operation (rotation in the reverse direction), similar to the case of rotation in the forward direction, a simple design is achieved and operation lever 2a provides operational ease.

According to the aforementioned actions, the photographer can completely close (cover) the aperture 2b with reliability by a simple series of lever operations, and no phenomena of failures, for example, half-closed aperture states, occur. Furthermore, similarly to the aforementioned case, since the photographer manually operates the operation lever 2a, movement can be performed with a small force and the operation can be performed with ease.

At this time, the first switch 13 is switched to the ON position on a temporary basis by operating the operation lever 2a in the forward direction and, thereafter, is returned to the OFF position by releasing the operation lever 2a. That is, the condition that the first switch 13 is in the OFF position and the second switch 14 is in the ON position is similar to those in the initial condition before the aforementioned start-up operation is brought about. Consequently, by constructing an algorithm similar to that in the above description, it is possible to return to the condition that the main power is turned OFF when the barrier member 3 closes (covers) the aperture 2b, and a start-up operation is awaited while a part of the internal circuits maintain a clock function, and the like, with very low power consumption.

As described above, according to the aforementioned embodiment, an image capture apparatus capable of opening (uncovering) and closing (covering) an aperture arranged in a rotary barrier cover with a barrier member by only operating the barrier cover-covering the picture-taking portion can be realized. The rotary barrier cover covering the camera body surface can be always returned to the initial position while only the barrier member is switched to open and close the aperture, and therefore, an image capture apparatus having excellent operability and design flexibility can be realized.

According to the present embodiment, an image capture apparatus can be realized in which the barrier member reliably can be switched into the completely open or completely closed condition.

According to the present embodiment, an image capture apparatus can be realized in which no malfunction and no failure in picture taking occurs even when an operation of a barrier cover is incomplete.

According to the present embodiment, even when the barrier cover is actuated, an area occupied thereby can be made small and compact.

According to the present embodiment, an image capture apparatus can be realized in which the barrier cover is operated with ease.

According to the present embodiment, an image capture apparatus can be realized in which the picture taking portion can be arranged at the center of a barrier cover and which has excellent operability and design flexibility.

According to the present embodiment, an image capture apparatus can be realized in which a barrier member can be made large by efficiently using space and avoiding a mount portion of the barrier cover and, therefore, the aperture can be opened or closed with reliability even when the lens has a large aperture.

According to the present embodiment, an image capture apparatus can be realized in which a view finder window can be arranged at a portion overlapping a barrier cover and which has excellent compactness.

According to the present embodiment, an image capture apparatus can be realized in which a stroboscope emission portion can be arranged at a portion overlapping a barrier cover and which has excellent compactness.

According to the present embodiment, an image capture apparatus can be realized in which a barrier cover of the front of the picture-taking portion can be opened and, at the same time, a main switch of the apparatus can be turned ON by only operating the barrier cover. Furthermore, an image capture apparatus can be realized in which a plurality of action (operation) modes of the apparatus can be selected simply by operation of the barrier cover.

According to the present embodiment, operation of a barrier cover can serve for uses other than opening and closing a barrier member that covers an image capture optical system.

According to the present embodiment, an image capture apparatus can be realized in which, when operation of the apparatus is automatically stopped in order to save power, a return to the start-up condition can be performed quickly by simple operation of a barrier cover.

According to the present embodiment, an image capture apparatus can be realized in which the aperture of the front of a picture-taking portion can be closed and, at the same time, a main switch of the apparatus can be turned OFF by only operating a barrier cover.

According to the present embodiment, an image capture apparatus can be realized in which, even when a barrier cover is improperly operated while the aperture is being closed, the aperture may be maintained in a closed condition.

Next, an embodiment of the internal configuration of the aforementioned image capture apparatus will be described.

Figure 9:
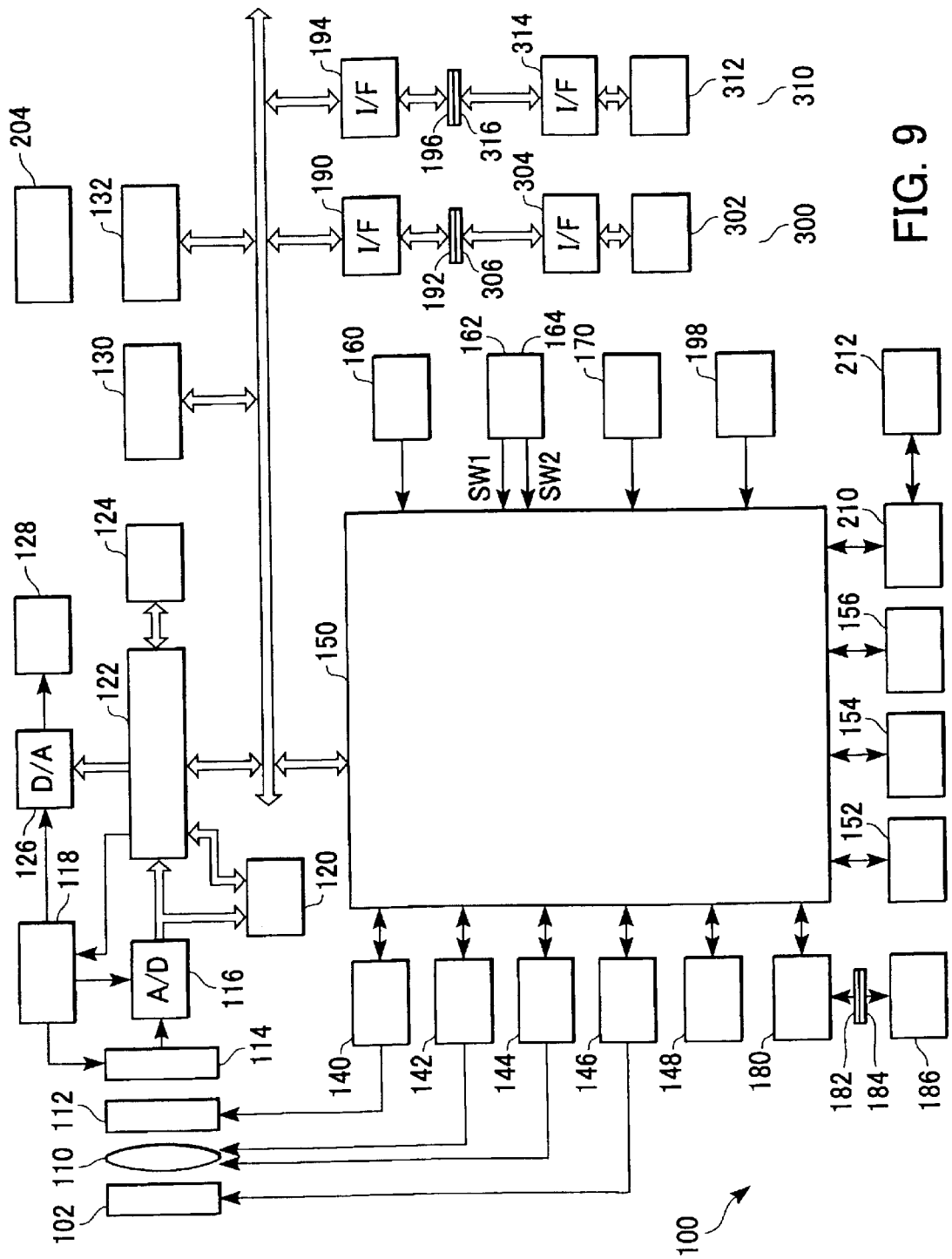
FIG. 9 is a configurational block diagram of an embodiment of the present invention.

In FIG. 9, reference numeral 100 denotes an image capture apparatus. Reference numeral 110 denotes an image capture lens, reference numeral 112 denotes a shutter provided with a diaphragm function, reference numeral 114 denotes a picture-taking element for converting an optical image into an electric signal (e.g., a CCD), and reference numeral 116 denotes an A/D converter for converting an analog signal output of the picture-taking element 114 into a digital signal.

Reference numeral 118 denotes a timing generation circuit for supplying a clock signal and a control signal to the picture-taking element 114, the A/D converter 116, and a D/A converter 126 and which is controlled by a memory control circuit 122 and a system control circuit 150.

Reference numeral 120 denotes an image processing circuit for performing a predetermined pixel interpolation or color conversion with respect to the data from the A/D converter 116 or the data from the memory control circuit 122. In the image processing circuit 120, AF (autofocus) processing, AE (autoexposure) processing, and EF (flash pre-emission) processing of a TTL (through-the-lens) system are performed, in which a predetermined operation is performed using the taken image data, and the system control circuit 150 controls an exposure control device 140 and a distance measurement control device 142 based on the obtained operation result.

Furthermore, in the image processing circuit 120, a predetermined operation is performed using the taken image data, and an AWB (auto white balance) processing of the TTL system is also performed based on the obtained operation result.

Reference numeral 122 denotes the memory control circuit for controlling the A/D converter 116, the timing generation circuit 118, the image processing circuit 120, an image display memory 124, the D/A converter 126, a memory 130, and a compression/expansion circuit 132.

The data of the A/D converter 116 is written into the image display memory 124 or memory 130 via the image processing circuit 120 and the memory control circuit 122 or directly via the memory control circuit 122.

Reference numeral 124 denotes the image display memory, reference numeral 126 denotes the D/A converter, and reference numeral 128 denotes an image display portion composed of a TFT LCD, or the like, and the image data for display written into the image display memory 124 is displayed by the image display portion 128 via the D/A converter 126. When the image data taken using the image display portion 128 is sequentially displayed, an electronic finder function can be realized.

The image display portion 128 can arbitrarily perform an ON/OFF operation under the direction of the system control circuit 150, and when the display is in the OFF position, the power consumption of the image capture apparatus 100 can be reduced by a large degree.

Reference numeral 130 denotes a memory for storing still images and moving images, and is provided with a storage capacity adequate for storing a predetermined number of still images and a predetermined amount of time of moving images. In this manner, even in the case of continuous-picture taking and panoramic picture taking, in which a plurality of still images are successively taken, high-speed and large quantities of image writing can be performed into the memory 130. The memory 130 can also be used as a work area of the system control circuit 150.

Reference numeral 132 denotes the compression/expansion circuit 132, which compresses and expands the image data, e.g., by adaptive discrete cosine transform (ADCT), etc., and which reads an image stored in the memory 130, performs compression processing or expansion processing, and writes data that has been processed into the memory 130.

Reference numeral 140 denotes an exposure control device, which controls the shutter 112 provided with the diaphragm function and which has also a flash dimmer utility in conjunction with a flash 148.

Reference numeral 142 denotes a distance measurement control device for controlling focusing of the image capture lens 110, reference numeral 144 denotes a zoom control device for controlling zooming of the image capture lens 110, and reference numeral 146 denotes a barrier control device for controlling the action of a protection device 102 (barrier member).

Reference numeral 148 denotes a flash having a function of emitting AF fill light and a flash dimmer utility as well. The exposure control device 140 and the distance measurement control device 142 are controlled using a TTL system, and the system control circuit 150 controls the exposure control device 140 and the distance measurement control device 142 based on the operation result of the taken image data operated by the image processing circuit 120. Reference numeral 150 denotes the system control circuit for controlling the overall image capture apparatus 100, reference numeral 152 denotes a memory to store constants, variables, programs, etc., for the action of the system control circuit 150.

Reference numeral 154 denotes a display portion, for example, a liquid crystal display device and a speaker, for displaying action conditions, messages, etc., using characters, images, voices, etc., in accordance with execution of programs in the system control circuit 150, and at least one display portion is arranged at the location visually identified with ease in the neighborhood of the operation portion of the image capture apparatus 100, and is composed of the combination of for example, an LCD, an LED, and an audio element. A part of the functions of the display portion 154 are arranged in an optical finder 204.

Among the contents displayed by the display portion 154, examples of contents displayed by the LCD, etc., include, for example, an action mode display, single shot/continuous-exposure display, self-timer display, compression rate display, display of the number of recording pixels, display of the number of recording sheets, display of the number of remaining sheets usable for picture taking, shutter speed display, f-stop number display, exposure compensation display, flash display, red-eye alleviation display, macro picture-taking display, buzzer setting display, clock battery remaining quantity display, battery remaining quantity display, error display, information display by a plurality of numerals, display of attachment or detachment condition of recording media 300 and 310, communication I/F action display, and date and time display.

Among the contents displayed by the display portion 154, examples of contents displayed in the optical finder 204 include, for example, an action mode display, focusing display, camera movement alarm display, flash charging display, shutter speed display, f-stop number display, and exposure compensation display. Reference numeral 156 denotes a nonvolatile memory capable of being electrically erased and recorded, such as an EEPROM, or the like.

Reference numerals 160, 162, 164, and 170 denote operation devices for inputting various action directions to the system control circuit 150; these devices may include a switch, a dial, a touch panel, a line of sight detection device, a voice recognition device, or a combination thereof. Here, examples of such operation devices will be specifically described.

Reference numeral 160 denotes a power switch which can turn the power ON and OFF; in addition, when this switch is operated in the turn-ON direction of the power switch, after the power already has been turned ON, it is possible to switch among various functional action (operation) modes, for example, an automatic still image picture-taking mode, a manual still image picture-taking mode, a panoramic picture-taking mode, a moving image picture-taking mode, a playback mode, a multi-screen playback and erase mode, and a PC connection mode.

Reference numeral 162 denotes a shutter switch SW1 which is turned ON during the operation of the shutter button, although not shown in the drawing, so as to start various actions (operations) such as AF (autofocus) processing, AE (autoexposure) processing, AWB (auto white balance) processing, EF (flash pre-emission) processing, etc.

Reference numeral 164 denotes a shutter switch SW2 which is turned ON at completion of an operation of the shutter button, although not shown in the drawing, so as to start various actions (operations) of a series of processing, exposure processing for writing the image data based on the signal read out from the picture taking element 112 into the memory 130 via the A/D converter 116 and the memory control circuit 122, development processing using the operation in the image processing circuit 120 and the memory control circuit 122, and recording processing for reading out the image data from the memory 130, performing compression in the compression/expansion circuit 132, and writing the image data into the recording medium 300 or 310.

Reference numeral 170 denotes an operation portion composed of various buttons, a touch panel, and the like, and examples thereof include a menu button, a set button, a macro button, a multi-screen playback and page-break button, a flash setting button, a single-exposure/continuous-exposure/self-timer switching button, a menu movement +(plus) button, a menu movement −(minus) button, a reproduced image movement +(plus) button, a reproduced image movement −(minus) button, a picture-taking image quality selection button, an exposure compensation button, a date/time setting button, an image display ON/OFF button, and a quick review ON/OFF button.

Reference numeral 180 denotes a power control device which is composed of a battery detection circuit, a DC-DC converter, a switching circuit for switching blocks to be energized, etc., and which performs detection of the presence or absence of a mounted battery, the type of battery, and a remaining quantity of the battery, controls the DC-DC converter based on the detection result and direction of the system control circuit 150, and supplies a required voltage for a required time to individual portions including the recording media.

Reference numeral 182 denotes a connector, reference numeral 184 denotes a connector, and reference numeral 186 denotes a power device composed of a primary cell, for example, an alkaline cell and a lithium cell, a secondary battery, for example, a NiCd battery, a NiMH battery, and a Li battery, an AC adaptor, and the like.

Reference numerals 190 and 194 denote interfaces to recording media, for example, memory cards and hard disks, reference numerals 192 and 196 denote connectors for performing connection to the recording media, for example, memory cards and hard disks, and reference numeral 198 denotes a recording medium attachment or detachment detection device for detecting whether or not the recording medium 300 or 310 is mounted to the connector 192 and/or the connector 196.

In the description of the present embodiment, it is assumed that two systems of interfaces and connectors are included for mounting a recording media. As a matter of course, the interface and connector for mounting the recording medium may be configured to be a single system or a plurality of systems. An interface and connector based on different standards may be arranged by combinations thereof. As the interface and connector, devices based on the standards for a PCMCIA card, a CF (Compact Flash (R)) card, and the like may be used for the configuration.

When the interfaces 190 and 194 and the connectors 192 and 196 based on the standards for the PCMCIA card, CF (Compact Flash (R)) card, and the like are used for the configuration, by being connected to various communication cards, for example, an LAN card and a modem card, a USB card, an IEEE 1 394 card, a P 1 284 card, an SCSI card, and a PHS, it is possible to exchange image data and management information attached to the image data with other computers and peripheral devices, for example, printer. Reference numeral 102 denotes a protection device (i.e., a barrier) for preventing the picture-taking portion from getting soiled and being broken by covering the picture-taking portion including the lens 110 of the image capture apparatus.

Reference numeral 204 denotes the optical finder, and it is possible to perform a picture taking operation using only the optical finder without using the electronic finder utility for the image display portion 128. A part of the functions of the display portion 154, for example, a focusing display, a camera movement alarm display, a flash charging display, a shutter speed display, an f-stop number display, and an exposure compensation display, are arranged in the optical finder 204.

Reference numeral 210 denotes a communication device having various communication functions, for example, RS232C and USB, IEEE 1 394, P 1 284, SCSI, modem, LAN, and wireless communication.

Reference numeral 212 denotes a connector, or an antenna in the case of wireless communication, for connecting the image capture apparatus 100 to other equipment with the communication device 210.

Reference numeral 300 denotes a recording medium, for example, a memory card and hard disk. The recording medium 300 is provided with a recording portion 302 composed of a semiconductor memory, a magnetic disk, or the like, an interface 304 to the image capture apparatus 100, and a connector 306 for performing connection to the image capture apparatus 100.

Reference numeral 310 denotes a recording medium, for example, a memory card as a hard disk. The recording medium 310 is provided with a recording portion 312 composed of a semiconductor memory, a magnetic disk, or the like, an interface 314 to the image capture apparatus 100, and a connector 316 for performing connection to the image capture apparatus 100.

Actions of the aforementioned configuration will be described with reference to FIG. 10 to FIG. 17.

Figure 10:
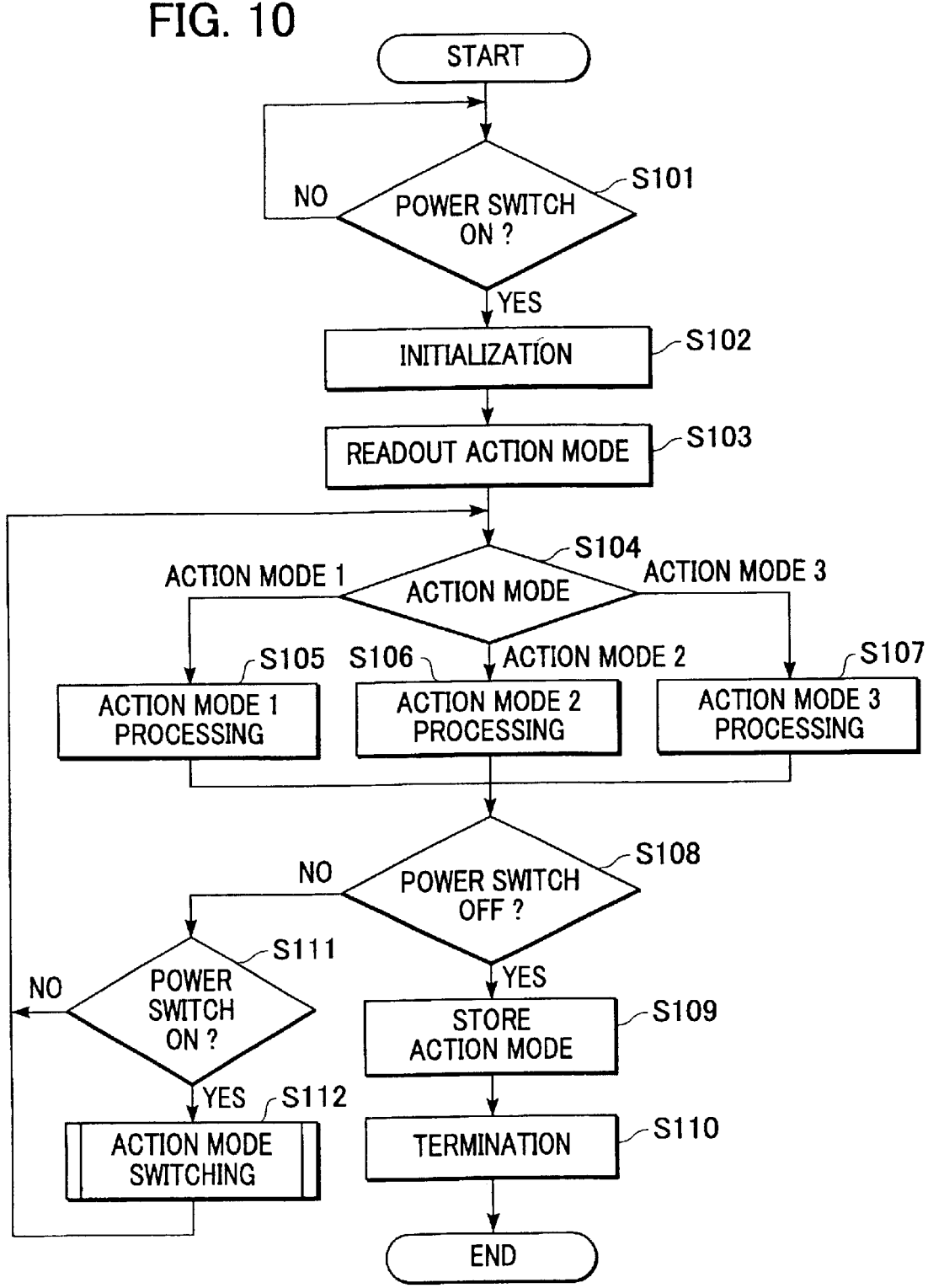
FIG. 10 is a flow chart illustrating the procedure of a main routine in an embodiment of the present invention.

FIG. 10 shows a flow chart of a main routine for illustrating action (operation) procedures of the image capture apparatus 100 of the present embodiment. Various actions (operations) of the image capture apparatus 100 will be described below with reference to FIG. 10. When the power switch 160 is operated in the turn-ON direction of the power (step S101), the system control circuit 150 executes a predetermined initialization (step S102), and reads out an action (operation) mode from the nonvolatile memory 156 (step S103).

The system control circuit 150 determines the action (operation) mode read out (step S104), and when it is action mode 1, action mode 1 processing (step S105) is executed, when it is action mode 2, action mode 2 processing (step S106) is executed, and when it is action mode 3, action mode 3 processing (step S107) is executed. At this time, when the power switch 160 is not operated (step S108 and step S111), a return to step S104 is required.

On the other hand, as a result of the determination at step S108, when power switch 160 is operated in the turn-OFF direction of the power, the current action mode is stored in the nonvolatile memory 156 (step S109), a predetermined termination process is executed (step S110) and, thereafter, processing is ended.

On the other hand, as a result of the determination at step S111, when the power switch 160 is operated in the turn-ON direction of power, action mode switching (step S112) is executed and, thereafter, a return to step S104 is required.

FIG. 11 to FIG. 17 are flow charts illustrating the detailed procedure in the action mode switching (step S112) shown in FIG. 10.

Figure 11:
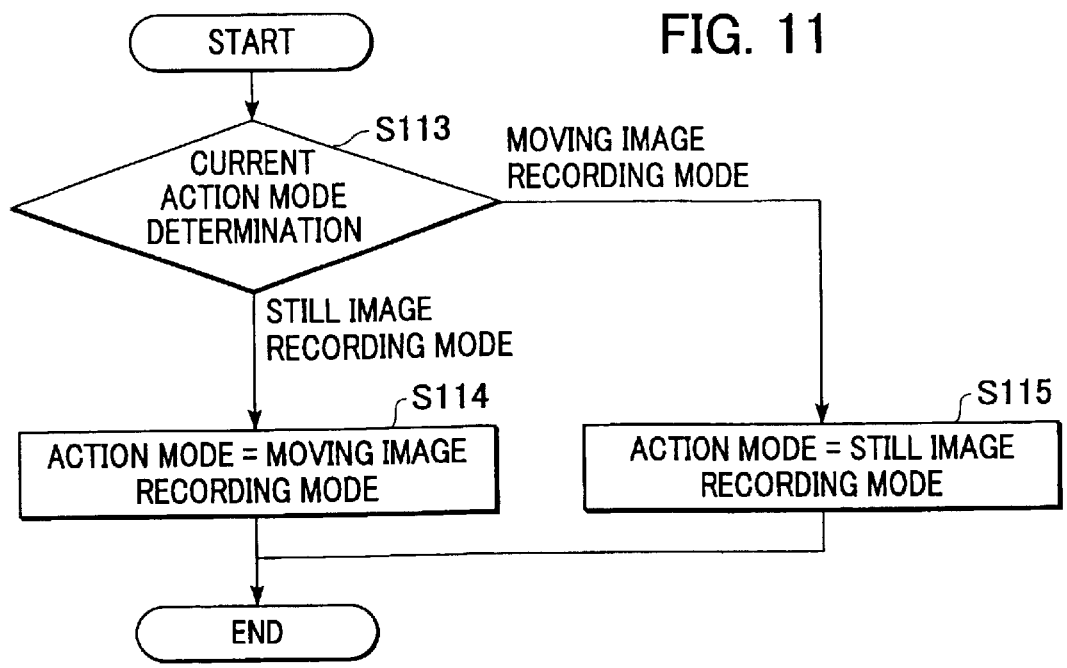
FIG. 11 is a flow chart illustrating the procedure of an action mode switching routine in an embodiment of the present invention.

FIG. 11 shows a detailed flow chart when the action mode is switched between a still image recording mode for recording a still image and a moving image recording mode for recording a moving image, alternately, in an action mode switching operation (step S112) shown in FIG. 10.

The system control circuit 150 determines the current action mode (step S113), and in accordance with the action mode determined, when the current action mode is the still image recording mode, the action mode is switched to the moving image recording mode (step S114).

On the other hand, when the current action mode is the moving image recording mode, the action mode is switched to the still image recording mode (step S115). In this manner, switching of the action mode between the still image recording mode and the moving image recording mode can be performed with ease by operating the power switch 160 in the turn-ON direction of the power.

Figure 12:
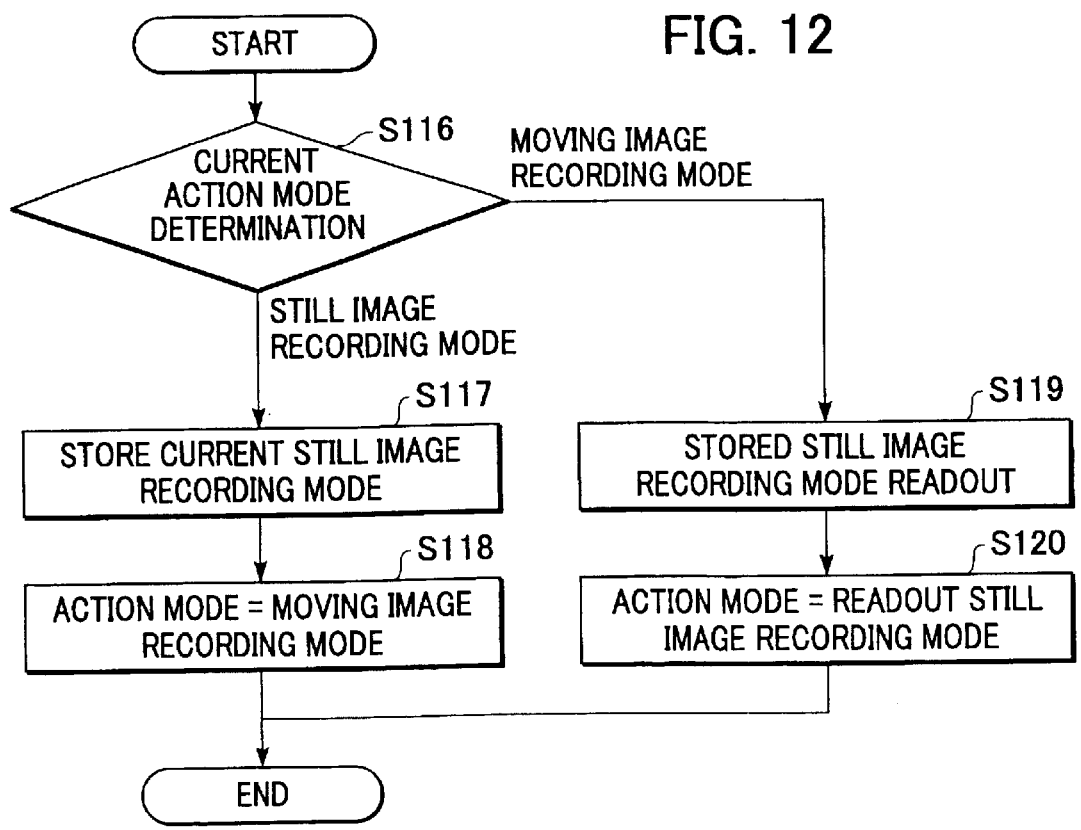
FIG. 12 is a flow chart illustrating the procedure of another action mode switching routine in an embodiment of the present invention.

FIG. 12 is a flow chart illustrating the detailed contents when the action mode is switched between the still image recording mode for recording a still image and the moving image recording mode for recording a moving image, alternately, in the action mode switching operation (step S112) shown in FIG. 10, when the still image recording mode includes a plurality of operation modes, for example, automatic mode, manual mode, and panoramic mode.

The system control circuit 150 determines the current action mode (step S116), and in accordance with the result of the determination, when the current action mode is the still image recording mode, the current type of still image recording mode is stored in the nonvolatile memory 156 (step S117), and the action mode is switched to the moving image recording mode (step S118).

On the other hand, as a result of the determination at step S116, when the current action mode is the moving image recording mode, the type of still image recording mode stored in the nonvolatile memory 156 is read out (step S119), and the action mode is switched to the read out type of still image recording mode (step S120).

In this manner, switching of the action mode between the still image recording mode, composed of a plurality of types of still image recording modes, and the moving image recording mode, can be performed with ease by operating the power switch 160 in the turn-ON direction. At this time, switching of the type of still image recording mode is performed separately.

Figure 13:
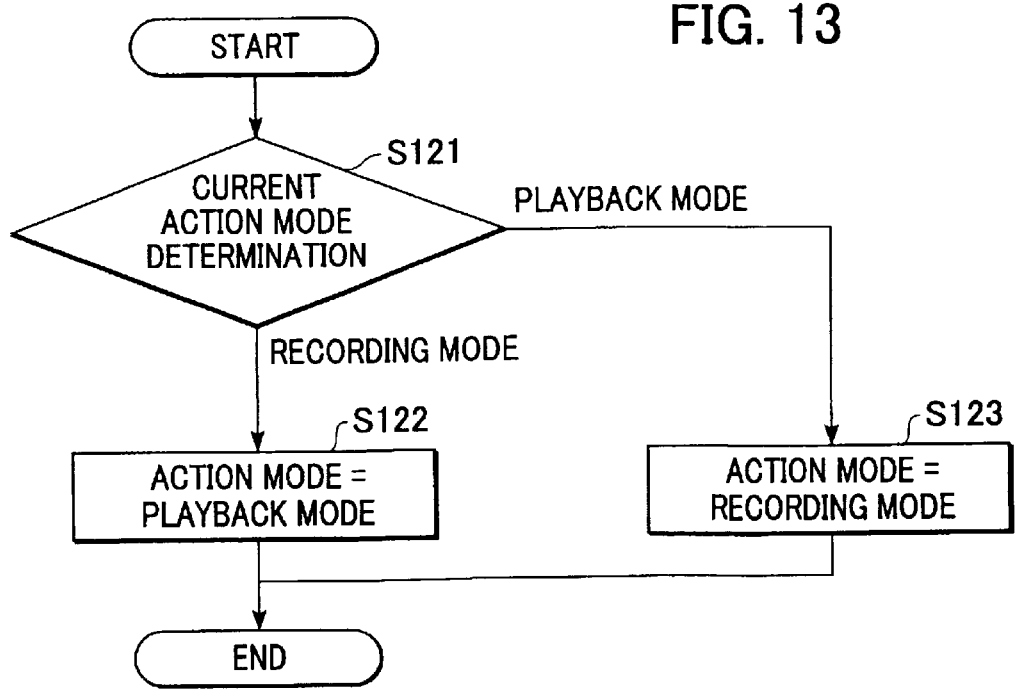
FIG. 13 is a flow chart illustrating the procedure of another action mode switching routine in an embodiment of the present invention.

FIG. 13 is a flow chart illustrating the detailed procedure when the action mode is switched between a recording mode for recording an image and a playback mode for reproducing an image recorded in the recording mode, alternately, in an action mode switching operation (step S112) shown in FIG. 10.

The system control circuit 150 determines the current action mode (step S121), and in accordance with the result of the determination, when the current action mode is the recording mode, the action mode is switched to the playback mode (step S122), and when the current action mode is the playback mode, the action mode is switched to the recording mode (step S123).

In this manner, switching of the action mode between the recording mode and the playback mode can be performed with ease by operating the power switch 160 in the turn-ON direction.

Figure 14:
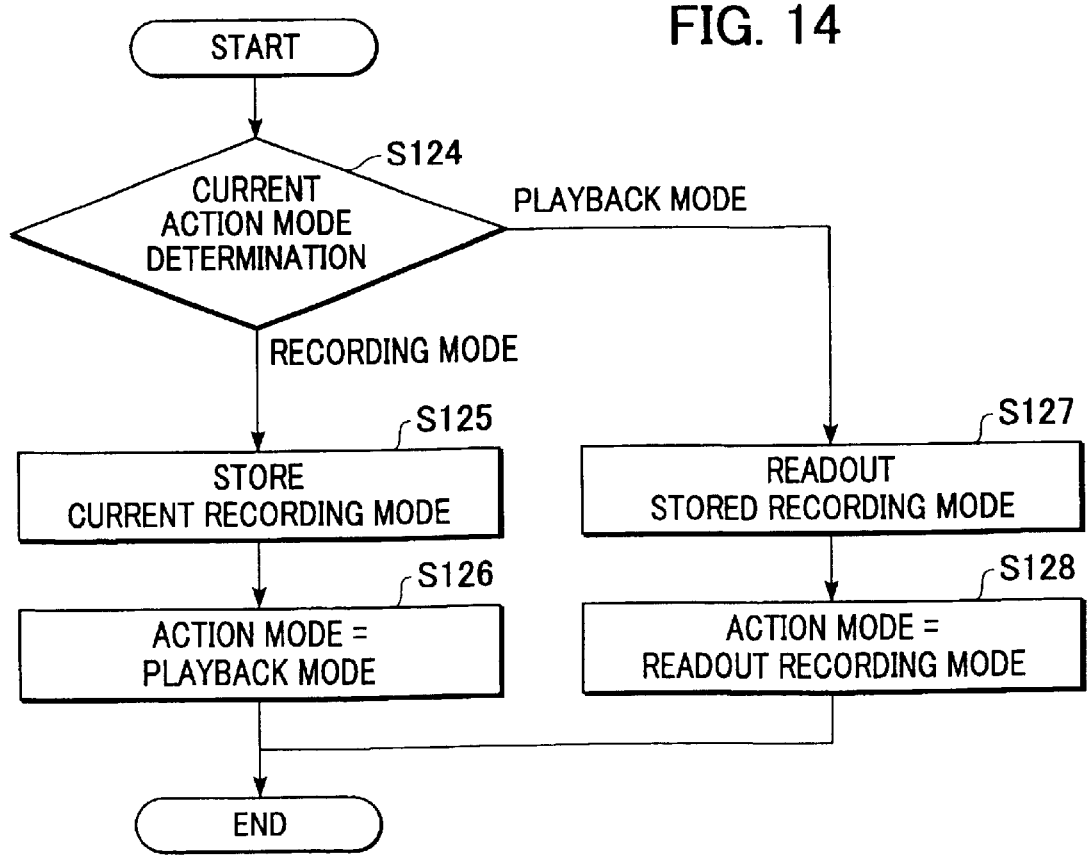
FIG. 14 is a flow chart illustrating the procedure of another action mode switching routine in an embodiment of the present invention.

FIG. 14 is a flow chart illustrating the detailed procedure when the action mode is switched between the recording mode and the playback mode, alternately, in an action mode switching operation (step S112) shown in FIG. 10, when the recording mode for recording an image includes a plurality of operation modes, for example, a still image recording mode for recording a still image and a moving image recording mode for recording a moving image, and the playback mode reproduces the image recorded in the aforementioned recording mode.

The system control circuit 150 determines the current action mode (step S124), and in accordance with the result of the determination, when the current action mode is the recording mode, the current type of recording mode is stored in the nonvolatile memory 156 (step S125), and the action mode is switched to the playback mode (step S126).

On the other hand, as a result of a determination at the step S124, when the current action mode is the playback mode, the type of recording mode stored in the nonvolatile memory 156 is read out (step S127), and the action mode is switched to the read out recording mode type (step S128).

In this manner, switching of the action mode between the recording mode, composed of a plurality of types of recording modes, and the playback mode, can be performed with ease by operating the power switch 160 in the turn-ON direction. In this case, switching among the types of recording modes is performed separately.

Figure 15:
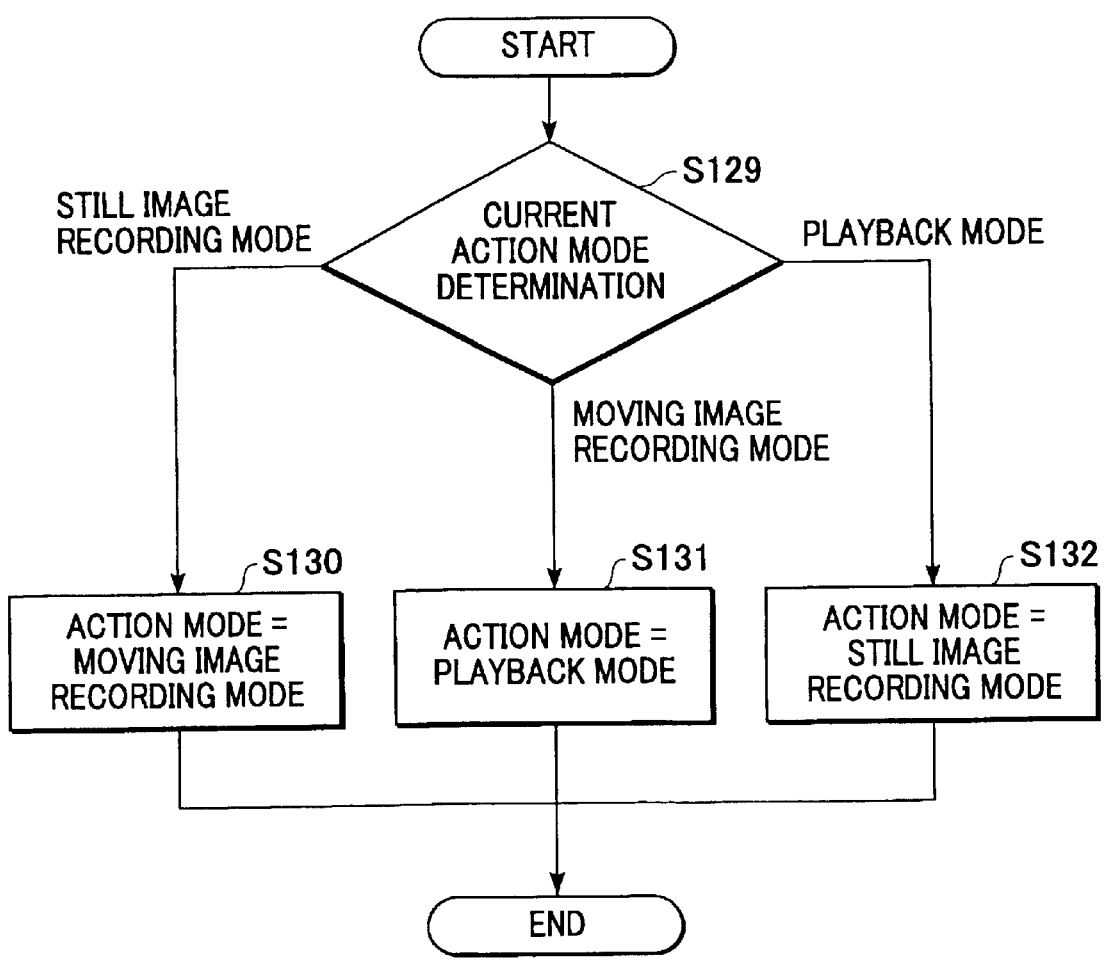
FIG. 15 is a flow chart illustrating the procedure of another action mode switching routine in an embodiment of the present invention.

FIG. 15 is a flow chart illustrating the detailed procedure when the action mode is switched among the still image recording mode for recording a still image, the moving image recording mode for recording a moving image, and the playback mode for reproducing an image recorded, in an action mode switching operation (step S112) shown in FIG. 10.

The system control circuit 150 determines the current action mode (step S129), and in accordance with the result of the determination, when the current action mode is the still image recording mode, the action mode is switched to the moving image recording mode (step S130). When the current action mode is the moving image recording mode, the action mode is switched to the playback mode (step S131). Furthermore, when the current action mode is the playback mode, the action mode is switched to the still image recording mode (step S132).

In this manner, switching of the action mode among a plurality of action modes can be performed with ease by operating the power switch 160 in the turn-ON direction. In this case, the order of switching among the action modes may be a fixed order, or a user may be allowed to arbitrarily set the order.

Furthermore, the user may be allowed to arbitrarily set a candidate for the action mode to be switched to. The number of types of action modes to be switched to is not limited to three; the number may be more than or less than three.

Figure 16:
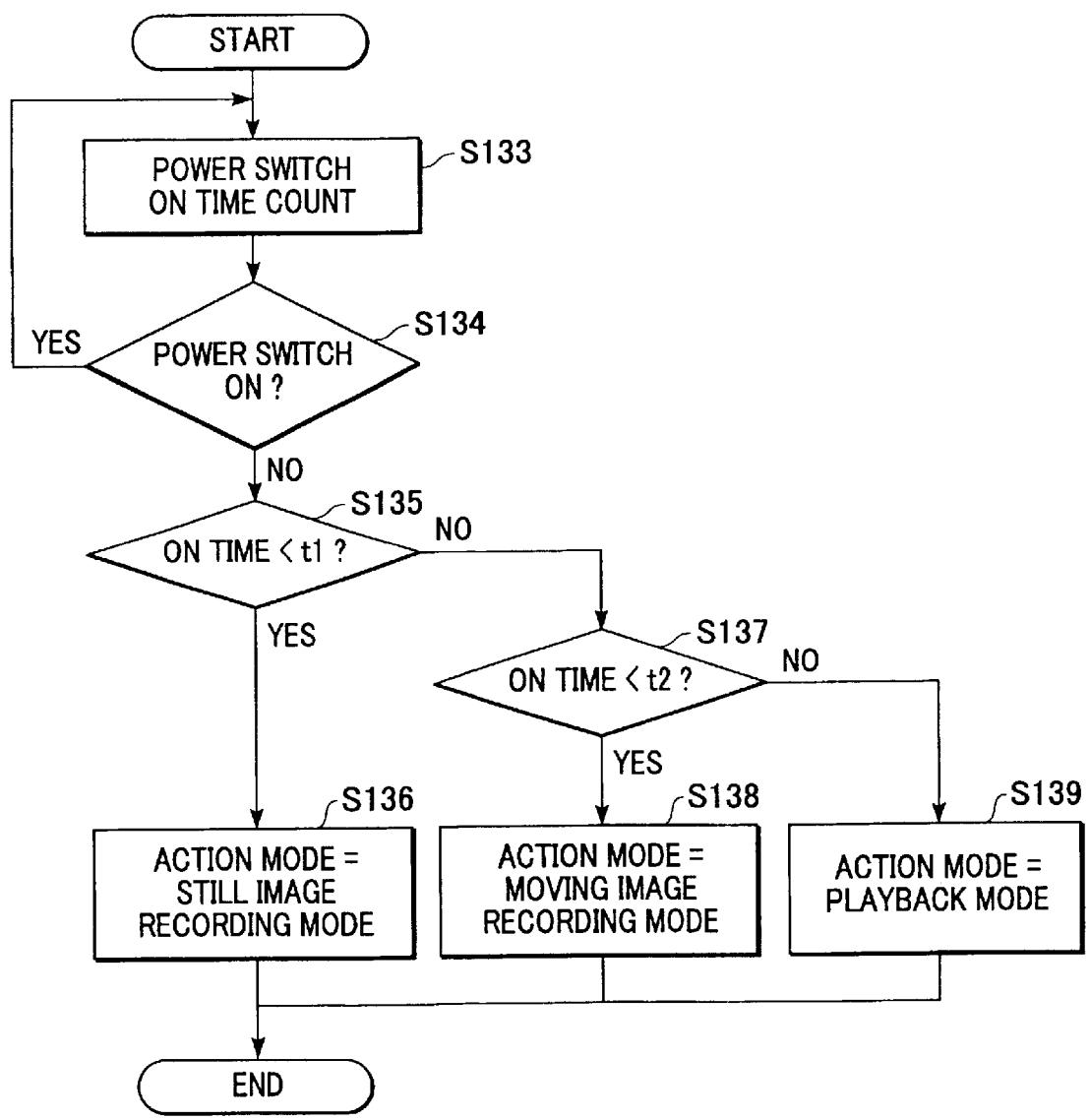
FIG. 16 is a flow chart illustrating the procedure of another action mode switching routine in an embodiment of the present invention.

FIG. 16 is a flow chart illustrating the detailed procedure when the action mode to be switched to is selected based on the amount of time the power switch 160 is kept in the turn-ON direction during an action mode switching operation (step S112), as shown in FIG. 10.

The system control circuit 150 counts the amount of time the power switch 160 is kept in the turn-ON direction (the "power-ON time") (step S133 and step S134). As a result, it is determined whether or not the power-ON time is shorter than a predetermined time t1 (step S135) and, when shorter, the action mode is switched to the still image recording mode (step S136).

On the other hand, as a result of the determination at step S135, when the power-ON time is equivalent to or more than the predetermined time t1, it is further determined whether or not the power-ON time is shorter than a predetermined time t2 at step S137. As a result of this determination, when shorter, the action mode is switched to the moving image recording mode (step S138).

As a result of the determination at step S137, when the power-ON time is equivalent to or more than the predetermined time t2, the action mode is switched to the playback mode (step S139).

The action mode(s) corresponding to each power-ON time of the power switch 160 may be fixed, or the user may be allowed to arbitrarily set each action mode with a corresponding power-ON time. The combination of the action mode with the power-ON time of the power switch 160 may be changed in accordance with the current action mode. The power-ON time of the power switch 160 may be a fixed value, or the user may be allowed to arbitrarily set the amount of time for each power-ON time.

The action mode to be switched to can be notified/identified to the user in advance of actual switching of the action mode by briefly displaying the selected action mode after a switching operation by using an icon, character, LED, etc., on the image display portion 128 or display portion 154, in accordance with the power-ON time of the power switch 160. The number of types of action modes to be switched among is not limited to three; the number may be more than or less than three.

Figure 17:
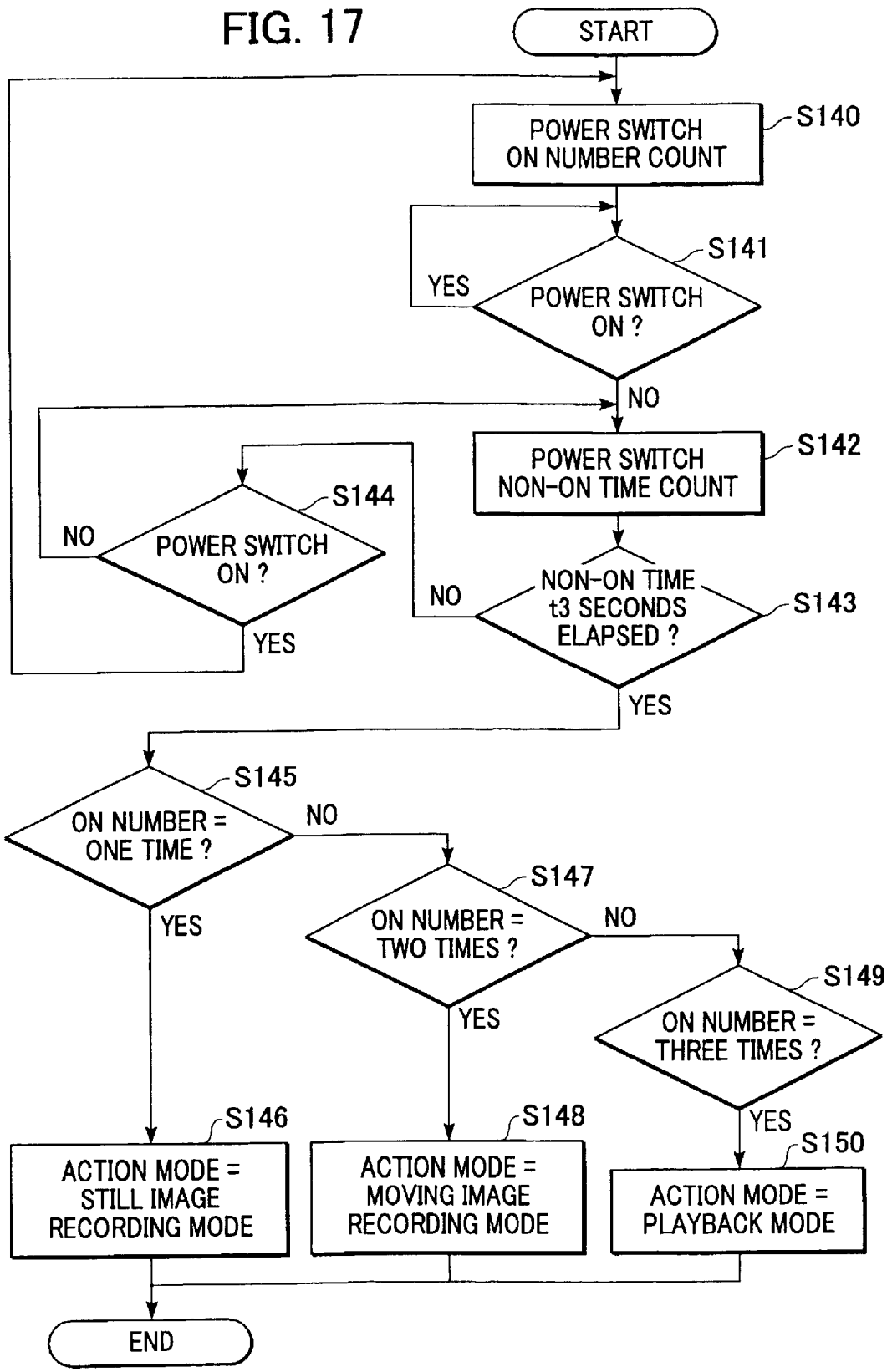
FIG. 17 is a flow chart illustrating the procedure of another action mode switching routine in an embodiment of the present invention.

FIG. 17 is a flow chart illustrating the detailed procedure when the action mode to be switched to is selected based on the number of times the power switch 160 is operated in the turn-ON direction of the power.

The system control circuit 150 counts the number of times of the power switch 160 is successively operated in the turn-ON direction at time intervals less than a predetermined time t3 (step S140, step S141, step S142, step S143, and step S144).

As a result, when the number of times is determined to be one time (step S145), the action mode is switched to the still image recording mode (step S146), and when the number of operations is determined to be two times (step S147), the action mode is switched to the moving image recording mode (step S148). Furthermore, when the number of times is determined to be three times or more (step S149), the action mode is switched to the playback mode (step S150).

The action mode corresponding to the number of times the power switch 160 is operated in the turn-ON direction during the predetermined time interval may be fixed, or the user may be allowed to arbitrarily set this correspondence. The combination of the action mode with the number of times the power switch 160 is operated in the turn-ON direction may be changed in accordance with the current action mode. The number of times the power switch 160 is operated in the turn-ON direction required to switch the action mode may be a fixed value, or the user may be allowed to arbitrarily set this number.

The action mode to be switched to can be notified/identified to the user in advance of actual switching of the action mode by briefly displaying the action mode after a switching operation by using an icon, character, LED, etc., on the image display portion 128 or display portion 154 in accordance with the number of times the power switch 160 is operated in the turn-ON direction. The number of types of action modes to be switched among is not limited to three; the number may be more than or less than three.

As described above, according to the present embodiment, the action mode can be switched with ease by simply operating the power switch in the turn-ON direction of the power during a current action mode of the image capture apparatus. In addition, the number of operation members required for switching among action modes of the image capture apparatus can be minimized.

In the above description of the preferred embodiments, switching among all action modes was performed by operating the power switch 160 in the turn-ON direction of the power. However, when there are many action modes, and switching to a specific action mode, for example, a playback mode or a moving image recording mode, is required to be performed quickly, as a matter of course, a mode switch exclusive to such specific mode may be arranged separately, and the current action mode may be switched to the specific action mode by operating the aforementioned exclusive mode switch.

In this case as well, the current action mode (before switching to the specific action mode) can be stored in the nonvolatile memory 156, and switching back to the stored action mode easily can be performed, e.g., by operating the exclusive mode switch again, or by operating the power switch 160 in the turn-ON direction of the power.

The present invention may be applied to a system composed of a plurality of devices, or may be applied to an apparatus composed of one device.

The present invention includes the performance in which in order that various devices are operated so as to realize the functions of the aforementioned embodiment, a program cord (sequence) of software for realizing the functions of the aforementioned embodiment is supplied to a computer in an apparatus or system connected to the aforementioned various devices, and the aforementioned various devices are operated in accordance with the program stored in the computer (CPU or MPU) of the system or apparatus.

In this case, since the aforementioned program cord itself of the software realizes the functions of the aforementioned embodiment, the program cord itself and devices for supplying the program cord to the computer, for example, the storage medium storing such a program cord, constitute the present invention. Examples of usable storage media for storing such a program cord include, for example, a flexible disk, hard disk, optical disk, magneto-optical disk, CD-ROM, magnetic tape, nonvolatile memory card, and ROM.

It is needless to say that the embodiment of the present invention includes not only the case where the functions described in the aforementioned embodiment are realized by the computer executing the supplied program cord, but also the case where the functions shown in the aforementioned embodiment are realized by the program cord in cooperation with the OS (operating system) running in the computer, other application software, or the like.

The present invention also includes the case where after the supplied program cord is stored in the memory arranged on the extension board of the computer or the extension unit connected to the computer, a CPU, etc., arranged on the extension board or the extension unit perform a part of or all of the practical processing based on the direction of the program cord, and the functions in the aforementioned embodiment are realized by the processing.

As described above, according to the present embodiment, since switching between the still image recording mode and the moving image recording mode can be performed by operation of a switch used to turn-ON the power, transition between recording modes can be quickly performed with ease during operation, operability can be improved by a large degree and, in addition, the number of switches can be reduced. Consequently, significant effects are exerted on miniaturization, improvement of operability, and cost reduction of the image capture apparatus.

Since the action mode can be selected in accordance with the operation condition of the switch, for example, the action mode corresponding to the number of times a switch is successively operated in the turn-ON direction of the power at time intervals less than a predetermined time can be specified in advance, improvement of the operability can be achieved.

The action mode can be selected while the action mode to be switched to is checked in advance of actual switching of the action mode.

In the present invention, all of or a part of the configuration of the appended claim or the embodiment may form one apparatus, may be combined with other apparatuses, or may be a constituent elements of an apparatus.

The present invention can be applied to various forms of cameras, for example, electronic cameras which take still images or moving images by picture-taking elements, cameras using silver-salt films, single-lens reflex cameras, lens-shutter cameras, and surveillance cameras, picture-taking apparatuses other than cameras, optical apparatuses, and other apparatuses, and furthermore, to apparatuses applied to those cameras, picture-taking apparatuses, optical apparatuses, and other apparatuses, and in addition, to constituent elements of those apparatuses.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image capture apparatus comprising:
   (A) a protective cover for opening and closing a front of an image capture optical system;
   (B) a rotary device which brings said protective cover into an opening action by rotating from an initial position in a first direction and which brings said protective cover into a closing action by rotating from the initial position in a second direction; and
   (C) an energizing member for returning said rotary device to the initial position.

2. The image capture apparatus according to claim 1, wherein said rotary device rotates about the image capture optical system.

3. The image capture apparatus according to claim 2, wherein said rotary device has an aperture constituting an optical path of a ray to be taken into the image capture optical system.

4. The image capture apparatus according to claim 1, wherein when said rotary device is rotated by manual operation in the first or second direction and, thereafter, the manual operation is released, said first energizing member returns said rotary device to the initial position.

5. The image capture apparatus according to claim 1, further comprising a second energizing member for energizing said protective cover in at least one of open and close directions.

6. The image capture apparatus according to claim 5, wherein said second energizing member moves said protective cover to an open position independently of said rotary device in response to rotation of said rotary device to a predetermined position in the first direction.

7. The image capture apparatus according to claim 5, wherein said second energizing member moves said protective cover to a closed position independently of said rotary device in response to rotation of said rotary device to a predetermined position in the second direction.

8. The image capture apparatus according to claim 1, wherein said rotary device is nearly in a shape of a circle, and rotates about a center portion of the circle.

9. The image capture apparatus according to claim 1, wherein said rotary device has an aperture in order to avoid obstruction of a finder optical path at the initial position.

10. The image capture apparatus according to claim 1, wherein said rotary device has an aperture in order to avoid obstruction of a stroboscope emission portion at the initial position.

11. The image capture apparatus according to claim 1, further comprising a control device for bringing the image capture apparatus into an activated condition in response to rotation of said rotary device in the first direction.

12. The image capture apparatus according to claim 11, wherein said control device brings the image capture apparatus into an activated condition in response to said protective cover being brought into an open condition because of rotation of said rotary device in the first direction.

13. The image capture apparatus according to claim 11, wherein said control device switches action modes in response to rotation of said rotary device in the first direction while the image capture apparatus is in the activated condition.

14. The image capture apparatus according to claim 13, wherein the action modes include at least two of a moving picture taking mode, a picture taking mode, and a playback mode.

15. The image capture apparatus according to claim 13, wherein said control device comprises a memory for storing a condition of a previous action mode when the action modes are switched.

16. The image capture apparatus according to claim 13, wherein said control device selects the action mode to be switched to in accordance with a power-ON time of rotation of said rotary device in the first direction.

17. The image capture apparatus according to claim 13, wherein said control device selects the action mode to be switched to in accordance with the number of rotations of said rotary device within a predetermined time interval in the first direction.

18. The image capture apparatus according to claim 13, further comprising a display device for displaying the action mode to be switched to.

19. The image capture apparatus according to claim 13, further comprising a display device for displaying the action mode to be switched to in advance of performance of the switching to the action mode.

20. The image capture apparatus according to claim 11, wherein said control device sequentially switches the action modes to different modes in response to each rotation of said rotary device in the first direction while the image capture apparatus is in an activated condition.

21. The image capture apparatus according to claim 11, wherein when the image capture apparatus becomes in a condition of power-saving mode after being activated, said control device releases the power-saving mode in response to rotation of said rotary device in the first direction.

22. The image capture apparatus according to claim 1, further comprising a control device for bringing the image capture apparatus into a condition that power is turned OFF in response to rotation of said rotary device in the second direction.

23. The image capture apparatus according to claim 22, wherein said control device brings the image capture apparatus into a condition that power is turned OFF in response to said protective cover being brought into a closing condition because of rotation of said rotary device.

24. An image capture apparatus comprising:
   (A) a protective cover for opening and closing a front of an image capture optical system;
   (B) a rotary device which brings said protective cover into an opening action by rotating from an initial position in a first direction and which brings said protective cover into a closing action by rotating from the initial position in a second direction; and
   (C) a control device for bringing the image capture apparatus into an activated condition in response to rotation of said rotary device in the first direction, said control device switching action modes to different action modes in response to each rotation of said rotary device in the first direction while the image capture apparatus is in the activated condition.

25. The image capture apparatus according to claim 24, wherein the action modes include at least two of a moving picture taking mode, a picture taking mode, and a playback mode.

26. The image capture apparatus according to claim 24, wherein said control device comprises a memory for storing a condition of a previous action mode when the action modes are switched.

27. The image capture apparatus according to claim 24, wherein said control device selects the action mode to be switched to in accordance with a power-ON time of rotation of said rotary device in the first direction.

28. The image capture apparatus according to claim 24, wherein said control device selects the action mode to be switched to in accordance with the number of rotations of the rotary device within a predetermined time interval in the first direction.

29. The image capture apparatus according to claim 24, further comprising a display device for displaying the action mode to be switched to.

30. The image capture apparatus according to claim 24, further comprising a display device for displaying the action mode to be switched to in advance of performance of the switching to the action mode.

31. The image capture apparatus according to claim 24, wherein said control device brings the image capture apparatus into a condition that power is turned OFF in response to rotation of said rotary device in the second direction.

32. The image capture apparatus according to claim 24, wherein the control device sequentially switches the action modes to different modes in response to each rotation of said rotary device from the initial position in the first direction.

* * * * *

UNITED STATES PATENT AND TRADEMARK OFFICE
CERTIFICATE OF CORRECTION

PATENT NO.    : 6,748,168 B2
DATED         : June 8, 2004
INVENTOR(S)   : Kenya Nishiwaki et al.

It is certified that error appears in the above-identified patent and that said Letters Patent is hereby corrected as shown below:

Column 3,
Line 2, "cover in" should read -- cover is in --.

Column 5,
Lines 29 and 31, "groove if" should read -- groove 1f --.

Column 20,
Line 65, "elements" should read -- element --.

Signed and Sealed this

Thirtieth Day of November, 2004

JON W. DUDAS
*Director of the United States Patent and Trademark Office*